US012647676B2

(12) United States Patent
Amini et al.

(10) Patent No.: US 12,647,676 B2
(45) Date of Patent: Jun. 2, 2026

(54) NO-REFERENCE IMAGE QUALITY ASSESSMENT FOR ITERATIVE BATCH VIDEO ANALYSIS

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 178 days.

(21) Appl. No.: 18/746,259

(22) Filed: Jun. 18, 2024

(65) Prior Publication Data

US 2024/0340530 A1     Oct. 10, 2024

Related U.S. Application Data

(63) Continuation-in-part of application No. 17/842,111, filed on Jun. 16, 2022, now Pat. No. 12,022,188, (Continued)

(51) Int. Cl.
  *H04N 23/661*       (2023.01)
  *G06T 7/00*         (2017.01)
     (Continued)

(52) U.S. Cl.
  CPC ......... *H04N 23/661* (2023.01); *G06T 7/0002* (2013.01); *H04N 23/617* (2023.01);
     (Continued)

(58) Field of Classification Search
  CPC .. H04N 23/661; H04N 23/617; G06T 7/0002; G06T 2207/10016; G06T 2207/30168;
     (Continued)

(56) References Cited

U.S. PATENT DOCUMENTS

| | | | | | |
|---|---|---|---|---|---|
| 10,587,796 | B1 * | 3/2020 | Sliz | ...................... | G06V 20/176 |
| 11,165,954 | B1 * | 11/2021 | Beach | ..................... | H04N 7/183 |

(Continued)

FOREIGN PATENT DOCUMENTS

| | | |
|---|---|---|
| WO | 2013/184571 A1 | 12/2013 |
| WO | 2018/140332 A1 | 8/2018 |

OTHER PUBLICATIONS

Supplemental European Search Report for EP Application 20880514.3 dated Sep. 29, 2023, 8 pages.

*Primary Examiner* — Shahbaz Nazrul
(74) *Attorney, Agent, or Firm* — Perkins Coie LLP

(57)           ABSTRACT

Introduced here are technologies for examining content generated by electronic devices in real time to optimize the quality of the content. The content may be examined in batches to address some of the drawbacks of real-time analysis. For instance, a series of videos may be examined to collect data on how well security system(s) that are presently employed are working. Each security system can include one or more electronic devices, such as cameras or microphones, and parameters of the electronic devices can be altered to improve the quality of content generated by the electronic devices.

20 Claims, 13 Drawing Sheets

Related U.S. Application Data which is a continuation of application No. 16/669,249, filed on Oct. 30, 2019, now Pat. No. 11,394,863, which is a continuation-in-part of application No. 16/562,322, filed on Sep. 5, 2019, now abandoned.

(60) Provisional application No. 62/727,941, filed on Sep. 6, 2018.

(51) Int. Cl.
   *G08B 13/196*        (2006.01)
   *H04N 23/617*       (2023.01)

(52) U.S. Cl.
   CPC ............... *G06T 2207/10016* (2013.01); *G06T 2207/30168* (2013.01); *G08B 13/1966* (2013.01)

(58) Field of Classification Search
   CPC .......... G08B 13/1966; G08B 13/19613; G08B 13/19632; G08B 13/19656
   See application file for complete search history.

(56)        References Cited

U.S. PATENT DOCUMENTS

| | | | |
|---|---|---|---|
| 11,394,863 B2 | 7/2022 | Amini | |
| 11,503,381 B2* | 11/2022 | Larrew | H04N 7/181 |
| 12,022,188 B2 | 6/2024 | Amini | |
| 12,142,031 B1* | 11/2024 | Nightingale | H04N 23/617 |
| 2016/0080692 A1 | 3/2016 | Hsu | |
| 2016/0284095 A1* | 9/2016 | Chalom | G06F 18/2413 |
| 2017/0061214 A1* | 3/2017 | Huang | H04N 7/0117 |
| 2018/0167620 A1 | 6/2018 | Li et al. | |
| 2018/0220061 A1* | 8/2018 | Wang | G06N 3/08 |
| 2019/0028634 A1 | 1/2019 | Koehler et al. | |
| 2019/0171897 A1* | 6/2019 | Merai | G06N 3/08 |
| 2019/0228540 A1 | 7/2019 | Citerin et al. | |
| 2019/0261243 A1 | 8/2019 | Amini et al. | |
| 2019/0288911 A1 | 9/2019 | Amini et al. | |
| 2019/0313024 A1 | 10/2019 | Selinger et al. | |
| 2020/0051260 A1* | 2/2020 | Shen | G06N 3/04 |
| 2020/0221009 A1 | 7/2020 | Citerin et al. | |
| 2020/0356812 A1* | 11/2020 | Oleynik | G06N 3/0895 |
| 2022/0284613 A1* | 9/2022 | Yin | G06T 7/30 |

* cited by examiner

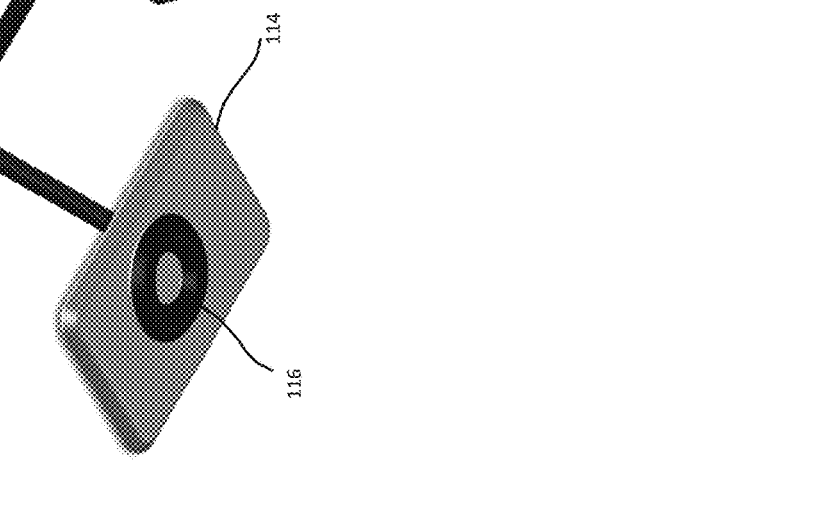
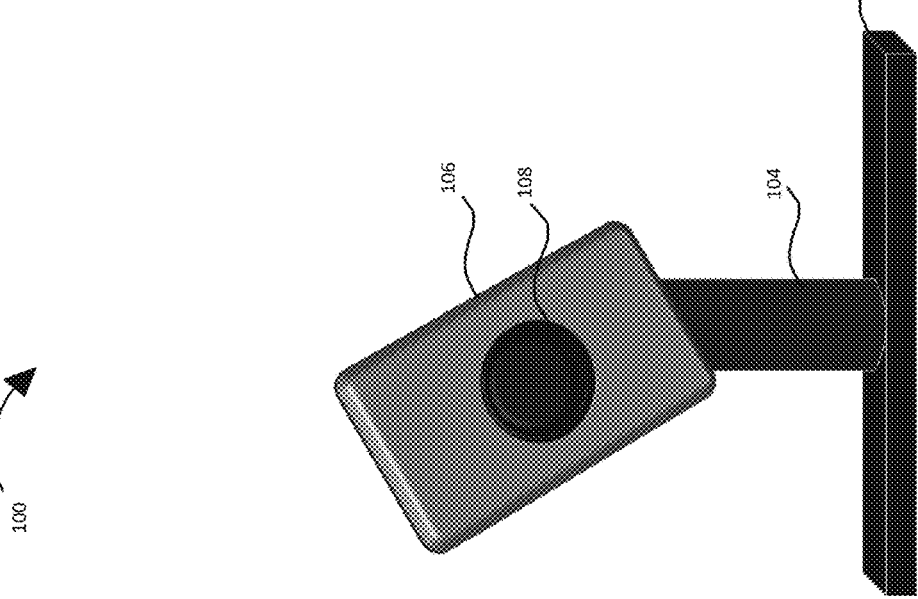
*FIG. 1*

500

Initial Training <u>505</u>

Pre-Launch Training <u>510</u>

Post-Launch Training <u>515</u>

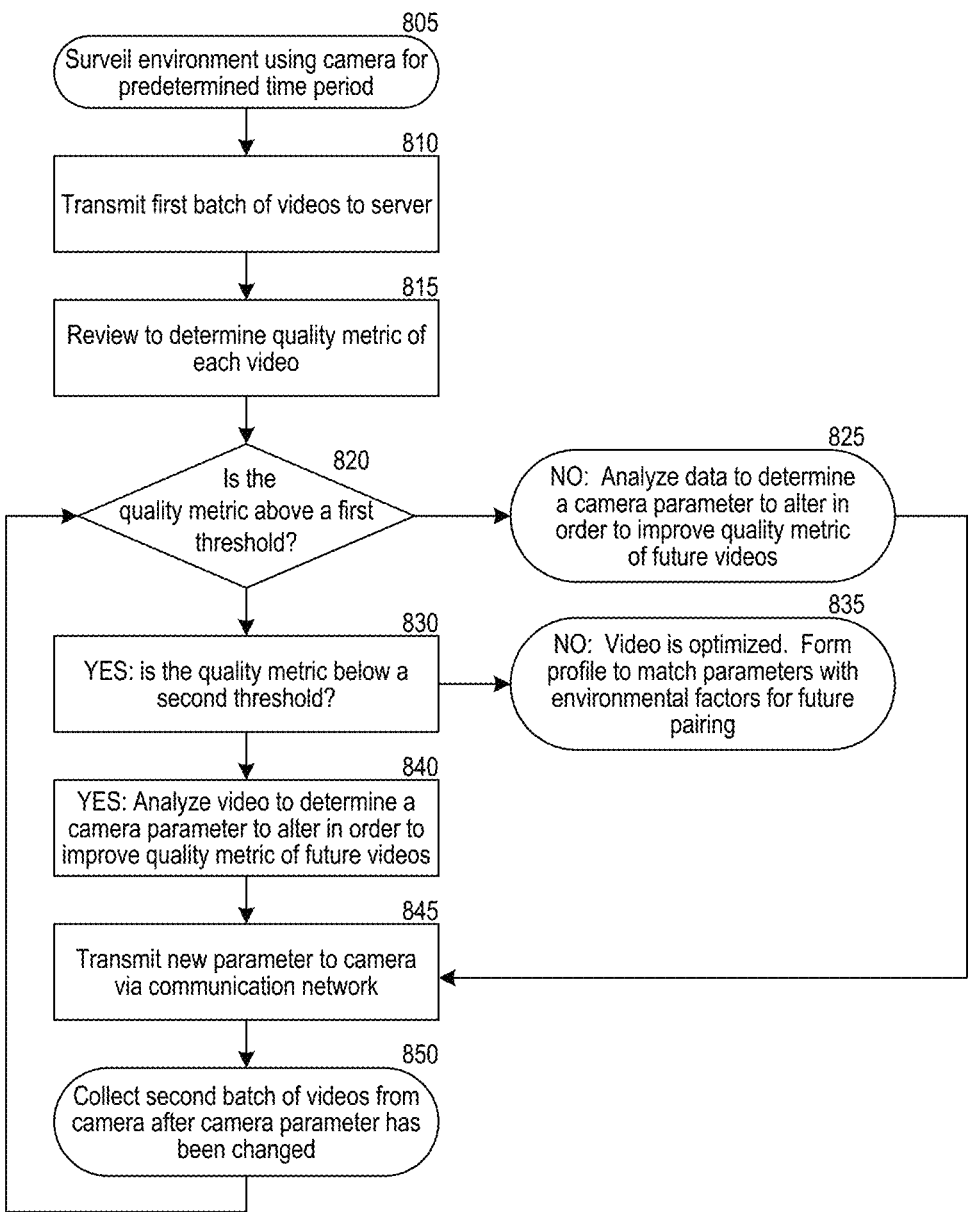

805

Surveil environment using camera for predetermined time period

810

Transmit first batch of videos to server

815

Review to determine quality metric of each video

820

Is the quality metric above a first threshold?

825

NO: Analyze data to determine a camera parameter to alter in order to improve quality metric of future videos

830

YES: is the quality metric below a second threshold?

835

NO: Video is optimized. Form profile to match parameters with environmental factors for future pairing

840

YES: Analyze video to determine a camera parameter to alter in order to improve quality metric of future videos

845

Transmit new parameter to camera via communication network

850

Collect second batch of videos from camera after camera parameter has been changed

*FIG. 8*

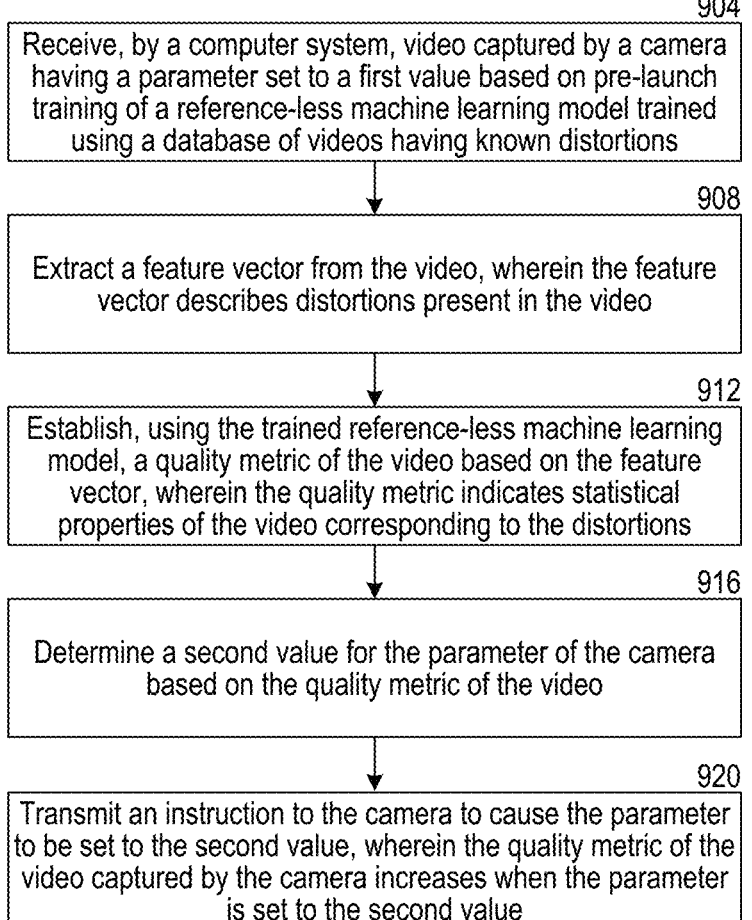

904
Receive, by a computer system, video captured by a camera having a parameter set to a first value based on pre-launch training of a reference-less machine learning model trained using a database of videos having known distortions 908
Extract a feature vector from the video, wherein the feature vector describes distortions present in the video 912
Establish, using the trained reference-less machine learning model, a quality metric of the video based on the feature vector, wherein the quality metric indicates statistical properties of the video corresponding to the distortions 916
Determine a second value for the parameter of the camera based on the quality metric of the video 920
Transmit an instruction to the camera to cause the parameter to be set to the second value, wherein the quality metric of the video captured by the camera increases when the parameter is set to the second value

*FIG. 9*

NO-REFERENCE IMAGE QUALITY ASSESSMENT FOR ITERATIVE BATCH VIDEO ANALYSIS

CROSS-REFERENCE TO RELATED APPLICATIONS

This application is a continuation-in-part of U.S. patent application Ser. No. 17/842,111, titled "No-Reference Image Quality Assessment for Video Analysis" filed Jun. 16, 2022, which is a continuation of U.S. patent application Ser. No. 16/669,249, titled "No-Reference Image Quality Assessment for Video Analysis" filed Oct. 30, 2019, now U.S. Pat. No. 11,394,863, which is a continuation-in-part of U.S. application Ser. No. 16/562,322, titled "No-Reference Image Quality Assessment for Video Analysis" filed Sep. 5, 2019, which claims priority to U.S. Provisional Application No. 62/727,941, titled "No-Reference Image Quality Assessment for Video Analysis" and filed Sep. 6, 2018, each of which is incorporated herein by reference in its entirety.

TECHNICAL FIELD

Various embodiments concern computer programs and associated computer-implemented techniques for assessing quality of the content generated by electronic devices such as security cameras, security lights, etc.

BACKGROUND

Surveillance is the monitoring of behavior, activities, or other changing information for the purpose of influencing, managing, or protecting people/items in a given environment. Generally, surveillance requires that the given environment be monitored by means of electronic devices such as security cameras, security lights, etc. For example, a variety of electronic devices can be deployed to detect activities performed in/around a home.

Surveillance systems (also referred to as "security systems") have historically included one or more cameras that were connected to a digital video recorder (DVR) via a hardwired connection. These cameras suffered from several drawbacks, and chief among them was the difficulty in deploying these cameras within an environment to be observed. Accordingly, entities have begun developing wireless cameras in an effort to address some of these drawbacks. Wireless cameras have proven to be very popular among consumers due to their low installation costs and flexible installation options. Moreover, many wireless cameras can be mounted in locations that were previously inaccessible to wired cameras. Thus, consumers can readily set up security systems for seasonal monitoring/surveillance (e.g., of pools, yards, garages, etc.).

SUMMARY

In some implementations, a computer system receives a first video captured by a camera having a parameter set to a first value based on pre-launch training of a reference-less machine learning model using a database of videos having known distortions. The computer system can be part of the camera, part of a base station communicably coupled to the camera, or part of a cloud server communicably coupled to the camera and/or the base station. A feature vector is extracted from the first video, wherein the feature vector describes distortions present in the first video. The computer system determines, using the reference-less machine learning model, a quality metric of the first video based on the feature vector. The quality metric indicates statistical properties of the first video corresponding to the distortions. The computer system determines a second value for the parameter of the camera based on the quality metric of the first video. The camera is caused to set the parameter to the second value, wherein the quality metric of a second video captured by the camera is greater than the quality metric of the first video when the parameter is set to the second value.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references can indicate similar elements.

FIG. 1 depicts a variety of electronic devices that can be used to monitor the home environment.

FIG. 8 depicts a flow diagram of a process that can be performed by a surveillance system.

FIG. 9 is a flowchart of a process for updating the parameters of a camera.

Figure 2A:
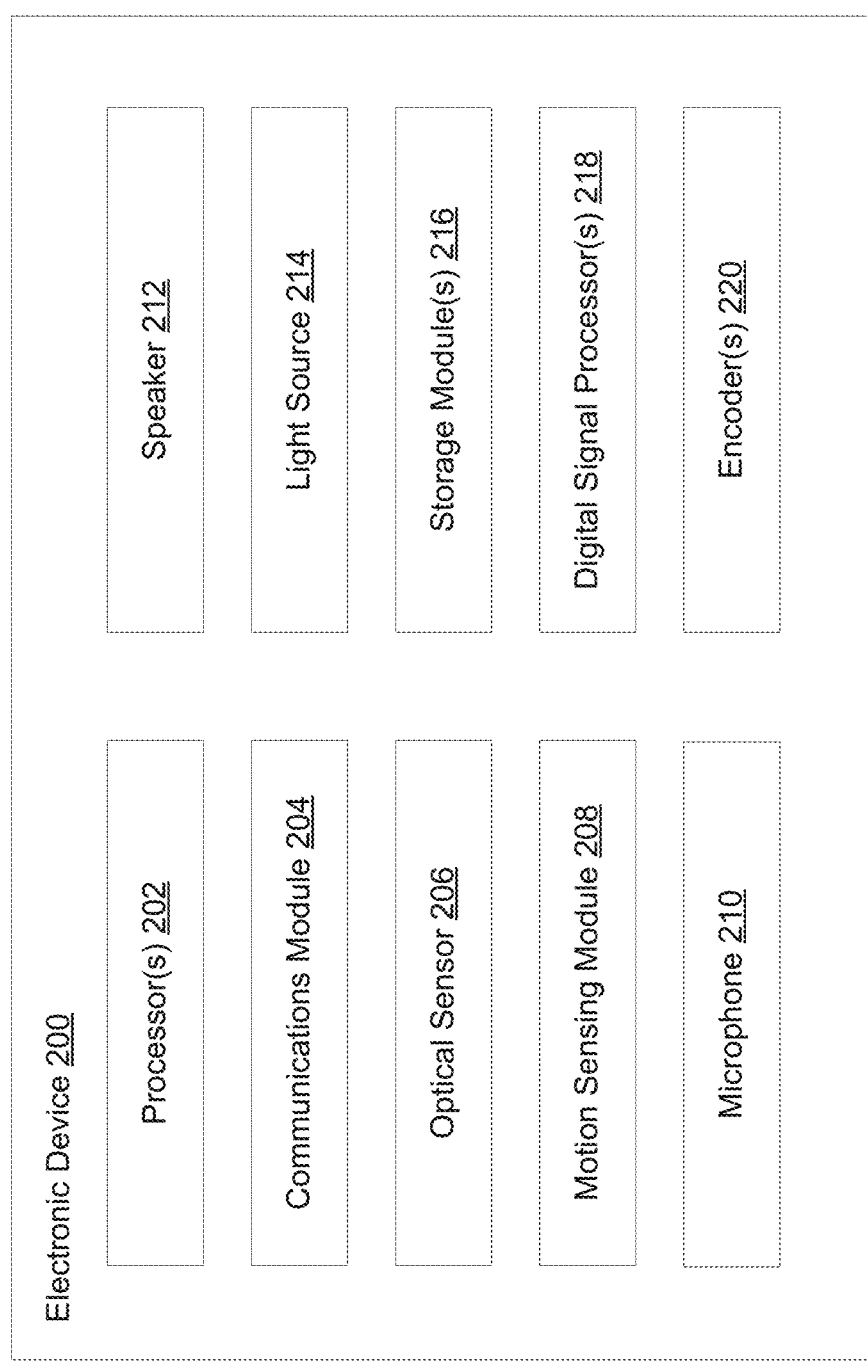
FIG. 2A is a high-level functional block diagram illustrating the architecture of an electronic device that monitors various aspects of a surveilled environment.

The drawings depict various embodiments for the purpose of illustration only. Those skilled in the art will recognize that alternative embodiments can be employed without departing from the principles of the technology. Accordingly, while specific embodiments are shown in the drawings, the technology is amenable to various modifications.

DETAILED DESCRIPTION

Surveillance can require that a given environment be monitored by means of various electronic devices, such as security cameras, security lights, etc. For instance, a surveillance system (also referred to as a "security system") designed to observe a home environment can include a base station that is communicatively coupled to camera(s), security light(s), video doorbell(s), audio doorbell(s), etc. At least some of these components can be connected to a computer server via a network. For instance, the base station can be capable of communicating with the computer server via the Internet. Content generated by a security system can be examined locally (i.e., by the security system itself) and/or remotely (e.g., by the computer server).

Generally, a network-connected security system includes a base station and one or more electronic surveillance devices. These electronic component(s) can collectively be referred to as the "hardware subcomponents" of the security system. The electronic surveillance device(s) can be configured to monitor various aspects of an observed environment. For example, cameras can be configured to record video upon detecting movement, while security lights can be configured to illuminate the observed environment upon detecting movement. Different types of electronic surveillance devices can create different types of content. Here, for example, the cameras can generate audio data and/or video data, while the security lights can generate metadata specifying a time at which each illumination event occurred, a duration of each illumination event, etc.

The base station, meanwhile, can be responsible for transmitting the content generated by the electronic surveillance device(s) to a network-accessible computer server. Thus, each electronic surveillance device can provide data to the base station, which in turn provides at least some of the data to the network-accessible computer server.

Nowadays, security systems can support features such as high-quality video recording, live video streaming, two-way audio transmission, cloud-based storage of recordings, instant alerts, etc. These features enable individuals to gain an in-depth understanding of what activities are occurring within the environment being observed or surveilled. However, security systems having these features also experience challenges.

For example, one challenge is to generate high-quality videos using the available memory, processing power, and bandwidth of the surveillance system. To generate high-quality videos, however, the security system should assess the quality of videos generated by the security system that will be viewed by an administrator (also referred to as a "user" or "customer"). Based on the assessed quality, the security system can determine whether to make changes in parameters used by the hardware subcomponents. For example, if the videos do not meet the quality threshold, re-optimization operations can be performed during post-processing of those videos. Due to the vast amount of video generated by a security system, however, the videos cannot be evaluated manually. Additionally, there is no reference video representative of the ideal quality of videos to be presented to the administrator.

Introduced here, therefore, are several different solutions for addressing these drawbacks. First, content generated by the hardware subcomponent(s) of a security system can be analyzed in batches. As further discussed below, batch analysis can be performed by a base station, a network-connected computer server, or any combination thereof. The hardware subcomponents distributed throughout various environments can collect millions of files (e.g., video clips, audio clips, metadata) each day, and these files can be analyzed (e.g., by the base station of each security system, or computer server(s) connected to these security systems) in batches.

More specifically, these files can be analyzed to collect data on how well the corresponding security systems work, so that the adjustable parameters of the electronic devices responsible for generating the files can be improved by the network-connected computer server. Results of such analysis can be rolled into parameters, software modules, etc., which can be pushed to base stations for distribution to the electronic devices. Alternatively, these parameters, software modules, etc., can be pushed directly to the electronic devices. For example, when battery strength is a significant concern, the network-connected computer server can periodically provide updated parameters to the (powered) base station, which can then push the updated parameters to any local electronic devices for implementation with minimal energy consumption.

In some embodiments, these adjustable parameters are optimized based on the characteristics of a single surveillance environment. Said another way, these parameters can be adjusted on an individual basis. In other embodiments, these adjustable parameters are optimized based on the characteristics of multiple surveillance environments. These surveillance environments can represent all surveillance environments known to the network-connected computer server. Alternatively, these surveillance environments can be associated with a cohort that includes the administrator. The cohort can include administrators that share a characteristic in common, such as geographical location, natural lighting levels, surveillance system topology (e.g., arrangement of electronic devices), etc. Accordingly, adjustable parameters can be optimized by the network-connected computer server for an electronic device based on characteristics of the administrator's surveillance environment and/or characteristics of other administrators' surveillance environments.

As a second solution, near real-time analysis of content generated by electronic devices can be performed by a base station, a network-connected computer server, or any combination thereof. In some embodiments, the network-connected computer server is one of multiple network-connected computer servers that form a server system. The server system can balance the load among the multiple network-connected computer servers (e.g., by intelligently distributing images for processing) to ensure the verification process is completed with low latency.

Third, a no-reference image quality assessment system is provided. Image quality assessment allows for adjustments or updates in parameters that are used by the surveillance to generate video data with improved quality. If quality is not met in a statistically significant number of videos, re-optimization can be done in a video lab. The no-reference image quality assessment system can include a training period and a subsequent period that uses data from the training period to assess the quality of the recorded video. The assessed quality of the recorded video is then used to adjust the parameters for improving the quality of subsequently recorded video.

Embodiments can be described with reference to particular computer programs, system configurations, networks, etc. However, those skilled in the art will recognize that these features are equally applicable to other computer program types, system configurations, network types, etc. For example, although the term "Wi-Fi network" can be used to describe a network, the relevant embodiment could be deployed in another type of network.

Moreover, the technology can be embodied using special-purpose hardware (e.g., circuitry), programmable circuitry appropriately programmed with software and/or firmware, or a combination of special-purpose hardware and programmable circuitry. Accordingly, embodiments can include a machine-readable medium having instructions that can be used to program a computing device (e.g., a base station or a network-connected computer server) to examine video content generated by an electronic device, identify elements included in the video content, apply a classification model to determine an appropriate action, and perform the appropriate action.

References in this description to "an embodiment" or "one embodiment" mean that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variants thereof are intended to include any connection or coupling between two or more elements, either direct or indirect. The coupling/connection can be physical, logical, or a combination thereof. For example, devices can be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module can be self-contained. A computer program can include one or more modules. Thus, a computer program can include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps can be performed in various sequences and combinations. For example, steps could be added to, or removed from, the processes described here. Similarly, steps could be replaced or reordered. Thus, descriptions of any processes are intended to be open-ended.

FIG. 1 depicts a variety of electronic devices that can be used to monitor the home environment. Examples of such electronic devices include security lights (e.g., the Arlo Security Light™), security cameras (e.g., the Arlo Ultra 2™, Arlo Essential™, Arlo Pro 5S 2K™, or Arlo Go 2™), audio/video recorders (e.g., Arlo Video Doorbell™ or Arlo Audio Doorbell™), etc. The electronic devices can be implemented using components of the example computer system 1100 illustrated and described in more detail with reference to FIG. 11.

Wall(s) 102 and 110 can function as the mounting area for the camera system 100. Other functional equivalents can also be used as the mounting area, such as doors, cabinets, or windows. Support structure(s) 104 and 112 are used to support the camera structure(s) 106 and 114. Camera(s) 108 and 116 are used to surveil the environment. Other surveillance devices can be implemented onto camera structure(s)

106 and 114 or be incorporated within camera(s) 108 and 116, such as light sources, motion detectors, speakers, microphones, etc.

These electronic devices can be configured to generate different types of content. For example, security cameras can generate video data responsive to a determination that movement has been detected. As another example, audio recorders can generate audio data responsive to a determination that movement has been detected. As another example, security lights can generate metadata specifying a time at which each illumination event occurred, a duration of each illumination event, etc., responsive to a determination that movement has been detected. Therefore, while the term "content" can be used to refer to video content below, those skilled in the art will recognize that the term "content" includes any data that can be generated by these types of electronic devices.

FIG. 2A is a high-level functional block diagram illustrating the architecture of an electronic device 200 that monitors various aspects of an observed or surveilled environment. As further described below, the electronic device 200 can generate content while monitoring the observed or surveilled environment, and then transmit the content to a base station (e.g., base station 250 of FIG. 2B) for further review. The electronic device 200 and base station 250 can be implemented using components of the example computer system 1100 illustrated and described in more detail with reference to FIG. 11.

The electronic device 200 (also referred to as a "recording device") can include one or more processors 202, a communication module 204, an optical sensor 206, a motion sensing module 208, a microphone 210, a speaker 212, a light source 214, one or more storage modules 216, a digital signal processor(s) 218, and an encoder 220. The electronic device 200 can be a camera, a video doorbell, a smartphone, a tablet, etc.

The processor(s) 202 can execute instructions stored in the storage module(s) 216, which can be any device or mechanism capable of storing information. In some embodiments a single storage module includes multiple computer programs for performing different operations (e.g., image recognition, noise reduction, filtering), while in other embodiments each computer program is hosted within a separate storage module.

The communication module 204 can manage communication between various components of the electronic device 200. The communication module 204 can also manage communications between the electronic device 200 and a base station, another electronic device, etc. For example, the communication module 204 can facilitate communication with a mobile phone, tablet computer, wireless access point (WAP), etc. As another example, the communication module 204 can facilitate communication with a base station responsible for communicating with a network-connected computer server. More specifically, the communication module 204 can be configured to transmit content generated by the electronic device 200 to the base station for review. As further described below, the base station can examine the content itself or transmit the content to the network-connected computer server for examination.

The optical sensor 206 (also referred to as "image sensors") can be configured to generate optical data related to the observed or surveilled environment. Examples of optical sensors include charged-coupled devices (CCDs), complementary metal-oxide-semiconductors (CMOSs), Infrared detectors, etc. In some embodiments, the optical sensor 206 is configured to generate a video recording of the observed or surveilled environment responsive to, for example, determining that movement has been detected within the observed environment. In other embodiments, the optical data generated by the optical sensor 206 is used by the motion sensing module 208 to determine whether movement has occurred. The motion sensing module 208 can also consider data generated by other components (e.g., the microphone) as input. Thus, an electronic device 200 can include multiple optical sensors of different types.

The optical sensor detects light qualities that correspond to a pixel of the generated image. The detection occurs for a predetermined period depending on factors such as the desired frames per second and the shutter speed (e.g., 20 microseconds or 100 microseconds). During that period, the detected light properties are converted to a voltage. In some examples, the voltage indicates a property of the pixel, such as the lumens or color.

Parameters applied to the optical sensor determine how the voltage signal is read and processed. For example, the voltage signal can be amplified before it is read. Additionally, the sensor can use a set of parameters for a day mode and another set of parameters for a night mode. The night mode parameters take into account the fact that there is very low energy and color information in nighttime recordings. Due to the relatively low energy of night recordings, the voltage signal amplitude is relatively low and must be amplified. When the signal is amplified, noise becomes more pronounced. Additionally, pixels can be combined to gather more information per signal. For example, a parameter can be a shutter speed. A first value of the parameter results in a faster shutter speed. A second value can be lower than the first value, resulting in a slower shutter speed. Other parameters can be aperture size or distortion coefficients.

The optical sensor 206 can be in communication with a digital signal processor (DSP) 218. The DSP is a microprocessor that executes algorithms to filter, compress, or otherwise process analog signals. For example, a DSP can receive the detected voltage signal from the optical sensor 206. After processing by the DSP 218, the signal can be output to a video encoder for encoding.

The encoder 220 is used to convert digital video data from one format to another. Some encoders can include a reference frame and an interframe. The reference frame is a video frame that is used to predict future video frames. The interframe is a frame that is expressed in terms of one or more neighboring frames. This is accomplished by using interframe predictions based on the data of the reference frame. For example, the H. 264 and H. 265 encoding standards use iframes as an interframe. An encoder builds a predictive model of the image, and then produces a video based upon the prediction. This process is performed according to various parameters that can be adjusted to provide different outputs.

There are challenges associated with video encoding. The video data can include data that requires a lot of data storage, but the quality of the data itself can be unimportant to the overall quality of the video. For example, the video can capture a tree in a windy environment. The video can include a lot of data in order to capture the movement of each individual leaf in the wind. The data required to capture this video would be prohibitive in terms of data storage and data transmission. In this example, the encoder can adjust its parameters to blur the video data of the tree in order to reduce the amount of data to store and transmit. For example, a first value for a camera resolution parameter can be "1,920×1,080 pixels (1080p)," while a second value can be "2,560×1,440 pixels" or "3,840×2,160 pixels."

In some embodiments, the currently configured parameters can be unsuitable for a dynamically changing scene. For example, a person can walk in front of the trees and approach the surveilled area. If the encoder is using parameters that blur the trees, the same parameters will also blur the face of the approaching individual. The result is that the video would not provide a clear image of the approaching individual that would be necessary for identification. Additionally, parameters that meet the needs of one viewer do not necessarily meet the need of other viewers. For example, different viewers can have different data storage and data transmission bandwidth constraints. Different viewers can also have different latency requirements. To address this challenge, the encoder can use parameters that correspond to different types of scenes. Each type of scene can be associated with a set of parameters. Additionally, the encoder can provide different parameters for different administrators by optimizing parameters after deployment of the encoder.

Due to the vast number of scenes that different cameras can encounter, one set of parameters optimized for one scene may not be optimized for a different scene. Therefore, it is advantageous to determine different parameters for different scenes, different cameras, and/or different administrators. For example, a first value for a camera focal length parameter can be 70 mm while a second value can be 135 mm or 200 mm. The parameters that can be modified for the image sensor include the exposure, aperture, analog gain, and/or digital gain. The parameters that can be modified for the digital signal processor can include gamma encoding, auto focus, sharpness, color temperature, mapping colors, and noise filters. The parameters that can be modified for the Infrared detector can include different light levels and motion for different scenes. Finally, codec parameters that can be modified include bit rates, profiles, and quantization parameters for different levels of motion.

The microphone 210 can be configured to record sounds within the surveilled environment. The electronic device 200 can include multiple microphones. In such embodiments, the microphones can be omnidirectional microphones designed to pick up sound from all directions. Alternatively, the microphones can be directional microphones designed to pick up sounds coming from a specific direction. For example, if the electronic device 200 is intended to be mounted in a certain orientation (e.g., such that the camera is facing a doorway), then the electronic device 200 can include at least one microphone arranged to pick up sounds originating from near the point of focus.

The speaker 212, meanwhile, can be configured to convert an electrical audio signal into a corresponding sound that is projected into the surveilled environment. Together with the microphone 210, the speaker 212 enables an individual located within the surveilled environment to converse with another individual located outside of the surveilled environment. For example, the other individual can be a homeowner who has a computer program (e.g., a mobile application) installed on her mobile phone for monitoring the surveilled environment.

The light source 214 can be configured to illuminate the surveilled environment. For example, the light source 214 can illuminate the surveilled environment responsive to a determination that movement has been detected within the surveilled environment. The light source 214 can generate metadata specifying a time at which each illumination event occurred, a duration of each illumination event, etc. This metadata can be examined by the processor(s) 202 and/or transmitted by the communication module 204 to the base station for further review.

Embodiments of the electronic device 200 can include some or all of these components, as well as other components not shown here. For example, if the electronic device 200 is a security camera, then some components (e.g., the microphone 210, speaker 212, and/or light source 214) may not be included. As another example, if the electronic device 200 is a security light, then other components (e.g., a camera, microphone 210, and/or speaker 212) may not be included.

Figure 2B:
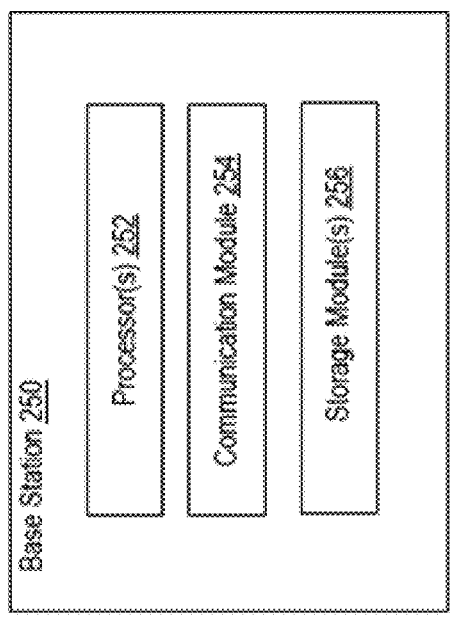
FIG. 2B is a high-level functional block diagram illustrating a base station configured to process content generated by electronic devices, forward the content to a network-connected computer server, etc.

FIG. 2B is a high-level functional block diagram illustrating a base station 250 configured to process content generated by electronic devices (e.g., electronic device 200 of FIG. 2A), forward the content to a network-connected computer server, etc.

The base station 250 can include one or more processors 252, a communication module 254, and one or more storage modules 256. In some embodiments a single storage module includes multiple computer programs for performing different operations (e.g., image recognition, noise reduction, filtering), while in other embodiments each computer program is hosted within a separate storage module. Moreover, the base station 250 can include a separate storage module for each electronic device within its corresponding surveillance environment, each type of electronic device within its corresponding surveillance environment, etc.

Such a categorization enables the base station 250 to readily identify the content/data generated by security cameras, security lights, etc. The content/data generated by each type of electronic device can be treated differently by the base station 250. For example, the base station 250 can locally examine sensitive content/data but transmit less-sensitive content/data for examination by a network-connected computer server.

Thus, in some embodiments the base station 250 examines content/data generated by the electronic devices to better understand what events are occurring within the surveilled environment, while in other embodiments the base station 250 transmits the content/data to a network-connected computer server responsible for performing such analysis.

The communication module 254 can manage communication with electronic device(s) within the surveilled environment and/or the network-connected computer server. In some embodiments, different communication modules handle these communications. For example, the base station 250 can include one communication module for communicating with the electronic device(s) via a short-range communication protocol, such as Bluetooth® or Near Field Communication (NFC), and another communication module for communicating with the network-connected computer server via a cellular network or the Internet.

Figure 3:
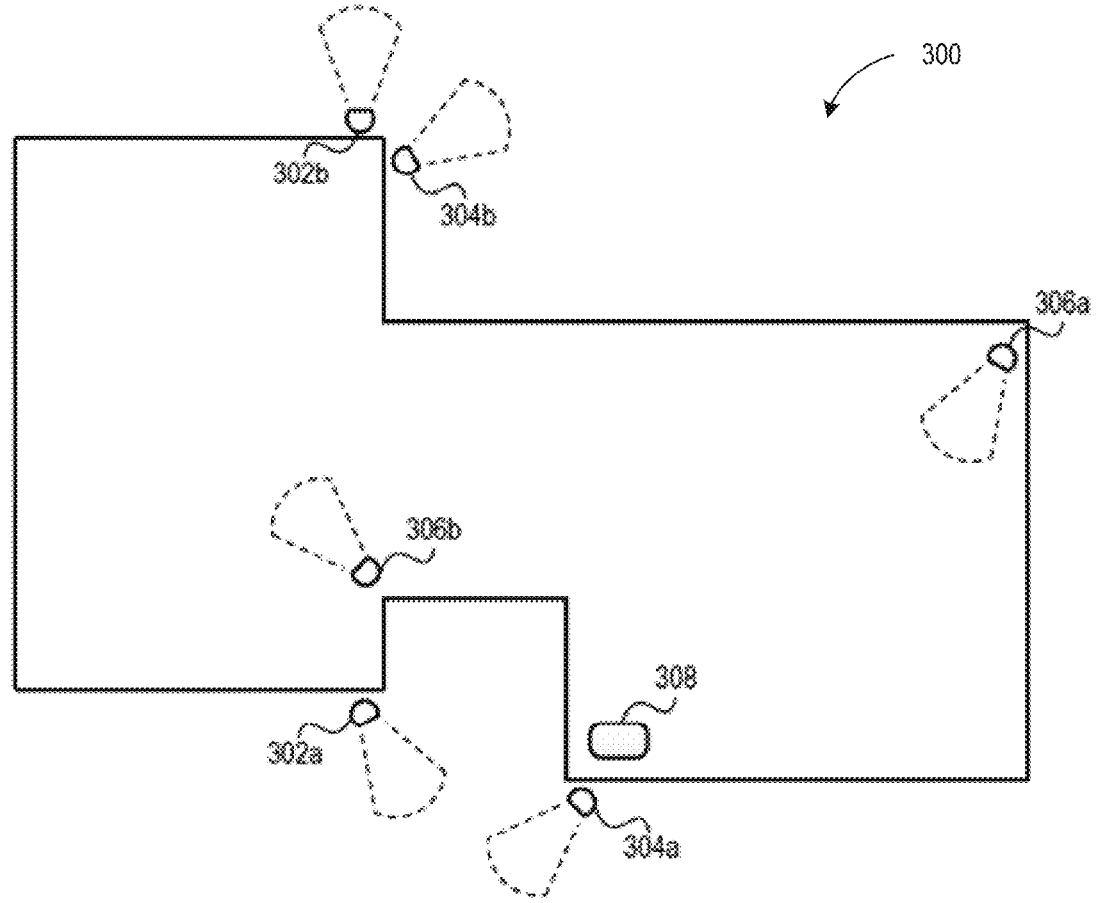
FIG. 3 depicts a network environment that includes a variety of electronic devices configured to collectively monitor a surveilled environment (e.g., a home).

FIG. 3 depicts a network environment 300 that includes a variety of electronic devices configured to collectively monitor a surveilled environment (e.g., a home). Here, the variety of electronic devices includes multiple security lights 302*a-b*, multiple external security cameras 304*a-b*, and multiple internal security cameras 306*a-b*. However, those skilled in the art will recognize that the network environment 300 could include any number of security lights, security cameras, etc.

Some or all of these electronic devices can be communicatively coupled to a base station 308 that is located in or near the surveilled environment. Each electronic device can be connected to the base station 308 via a wired communication channel or a wireless communication channel.

Figure 4A:
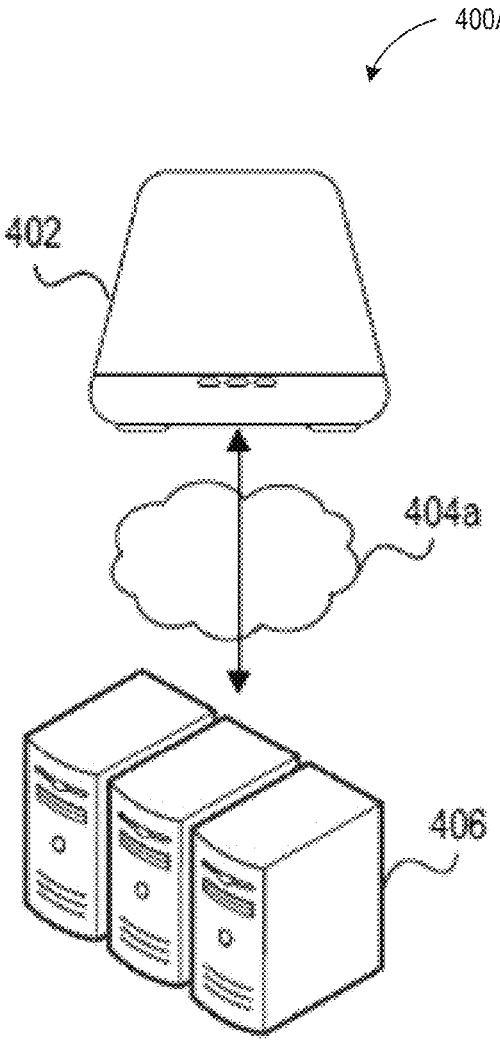
FIG. 4A illustrates a network environment that includes a base station designed to receive content generated by one or more electronic devices arranged throughout a surveilled environment.

FIG. 4A illustrates a network environment 400*a* that includes a base station 402 designed to receive content generated by one or more electronic devices arranged throughout a surveilled environment. The base station 402 can transmit at least some of the content to a network-accessible server system 406. The network-accessible server system 406 can supplement the content based on information inferred from content uploaded by other base stations corresponding to other surveilled environments.

The base station 402 and the network-accessible server system 406 can be connected to one another via a computer network 404*a*. The computer network 404*a* can be a personal area network (PAN), local area network (LAN), wide area network (WAN), metropolitan area network (MAN), cellular network, the Internet, etc.

Figure 4B:
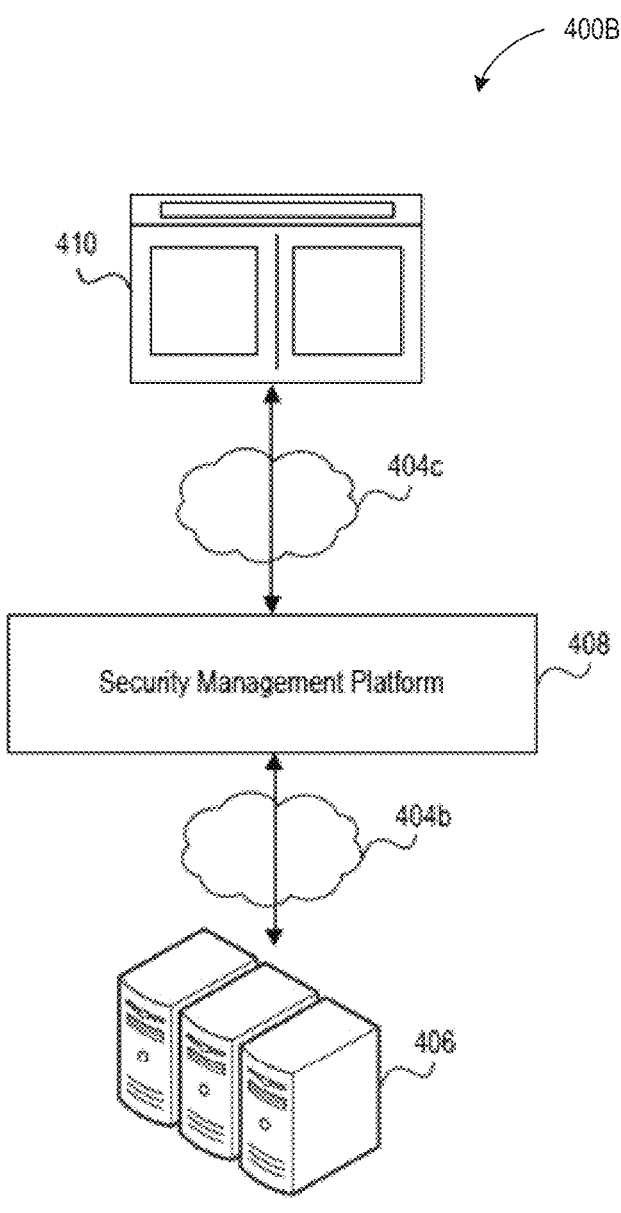
FIG. 4B illustrates a network environment that includes a security management platform that is supported by the network-accessible server system.

FIG. 4B illustrates a network environment 400*b* that includes a security management platform 408 that is supported by the network-accessible server system 406. Individuals can interface with the security management platform 408 via an interface 410. For example, a homeowner can examine content generated by electronic devices arranged in or near her home via the interface 410.

The security management platform 408 can be responsible for parsing content/data generated by electronic device(s) arranged throughout a surveilled environment to detect occurrences of events within the surveilled environment. The security management platform 408 can also be responsible for creating an interface through which an individual can view content (e.g., video clips and audio clips), initiate an interaction within someone located in the surveilled environment, manage preferences, etc.

As noted above, the security management platform 408 can reside in a network environment 400*b*. Thus, the security management platform 408 can be connected to one or more networks 404*b-c*. Similar to network 404*a*, networks 404*b-c* can include PANs, LANs, WANS, MANs, cellular networks, the Internet, etc. Additionally or alternatively, the security management platform 408 can be communicatively coupled to computing device(s) over a short-range communication protocol, such as Bluetooth or NFC.

The interface 410 is preferably accessible via a web browser, desktop application, mobile application, or over-the-top (OTT) application. Accordingly, the interface 410 can be viewed on a personal computer, tablet computer, personal digital assistant (PDA), mobile phone, game console, music player, wearable electronic device (e.g., a watch or fitness accessory), network-connected ("smart") electronic device (e.g., a television or home assistant device), virtual/augmented reality system (e.g., a head-mounted display), or some other electronic device.

Figure 5:
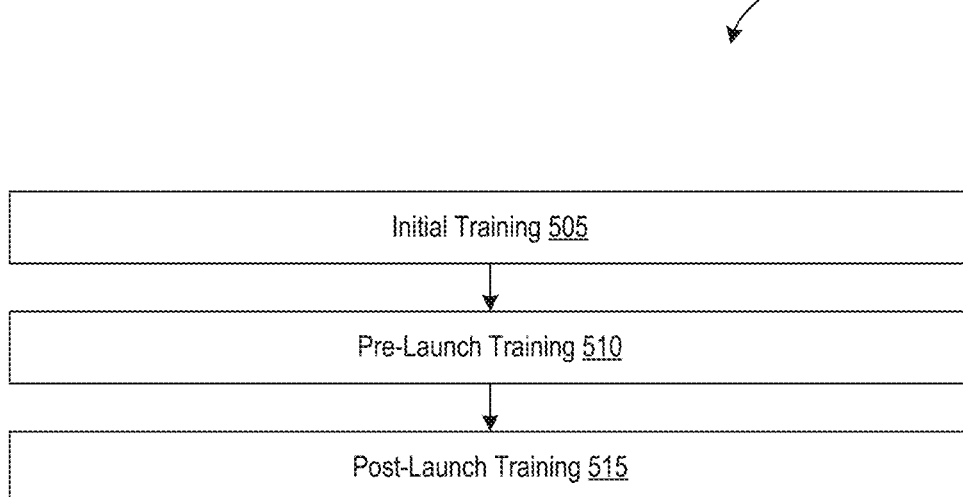
FIG. 5 depicts a flow diagram of a process for optimizing the quality of content generated by a hardware subcomponent of a security system.

FIG. 5 depicts a flow diagram of a process 500 for optimizing the quality of content generated by a hardware subcomponent of a security system. The process 500 can be applied to a network-connected surveillance system which includes a base station and one or more electronic devices. The electronic device(s) can be configured to monitor various aspects of a surveilled environment. For example, the electronic device(s) can include security camera(s) that generate a series of files (e.g., video clips) over time. The security camera(s) can be placed in a diverse variety of environments and conditions (e.g., indoors, outdoors, positioned for daytime recording, positioned for nighttime recording, subject to changing climate conditions, subject to potential interference such as animals entering the recorded area, etc.). Therefore, it is important to provide parameters that determine the operation of the camera such that the parameters optimize the quality of the recorded videos.

Moreover, to provide high-quality videos, it is important to evaluate the video quality that customers are receiving. If the recorded videos do not meet the video-quality threshold, re-optimization can be performed by readjusting the operational parameters. Such parameters can include, for example, optical parameters, image processing parameters, or encoding parameters. Examples of optical parameters are focal length, lens distortion, aperture, exposure times, etc. Examples of image processing parameters are sharpness, distortion, vignetting, lateral chromatic aberration, noise, etc. Examples of encoding parameters are compression types, bit rate, frame rates, etc.

Despite the need for re-optimization, a large amount of video can be generated across a plurality of security cameras over a long duration of time. Therefore, it is difficult to manually assess the quality of all the videos.

To address the issues discussed above, the process 500 involves multiple steps to train the network-connected surveillance system. The system can perform various steps at different phases of the deployment of the system to adjust the parameters used by the system. In step 505, the initial training can be done in an iterative manner and in a facility that simulates different scenes. Scenes can include outdoor, indoor, day, different lighting, night, etc. The iterative training can be performed before the components of the network-connected surveillance system are produced. At this step, the system can be under development and not yet deployed to administrators or customers. The system can be implemented on a development board with a larger amount of processing power and memory than is available in a deployed system. The higher amount of processing power and memory allows the system to process a larger amount of data than is available on a deployed system. In particular, large amounts of reference frames are compared with corresponding frames encoded by the encoder. By comparing the reference frames to the encoded frames, reference-based tweaking can be performed on the parameters. The parameters are tweaked such that the encoded frames have similar parameters as the reference frames. The comparison and tweaking can be performed offline and not in real time. Once the training is performed, parameters can be implemented into the manufactured components.

Figure 10:
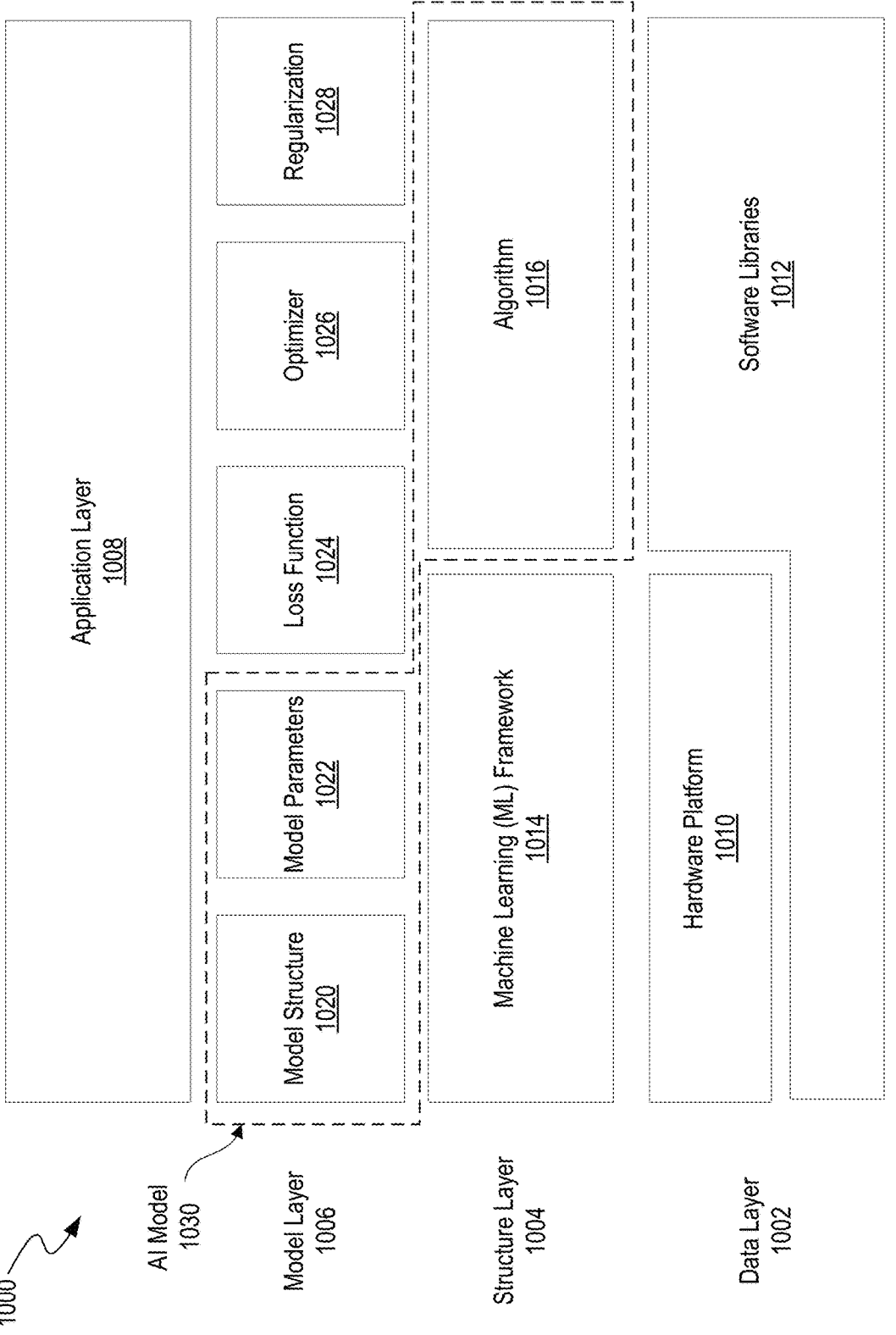
FIG. 10 is a block diagram illustrating an example artificial intelligence (AI) system, in accordance with one or more embodiments of this disclosure.

In some implementations, a reference-less machine learning model is used to determine a quality metric of a video based on a feature vector extracted from the video (see FIG. 9). The quality metric can indicate statistical properties of the video corresponding to distortions in the video. For example, in step 505, the system can utilize various models or methods to evaluate the quality of the videos. In some implementations, the AI model 1030 illustrated and described in more detail with reference to FIG. 10 is used. A method uses a collection of algorithms or data that allows for subjective evaluation. A model represents, for example, a collection of video data or parameters that permit comparison with the data and parameters of another video. Various video-quality assessment metrics, methods, and models can employ a high-quality file (e.g., a processed file) or a raw file as a reference that is compared against a recorded video. For example, the Mean-Squared Error (MSE) measures the average squared difference between actual and ideal pixel values. This metric is simple to calculate but does not align closely with the human perception of quality. The peak Signal-to-Noise Ratio (pSNR) is derived from the mean square error, and indicates the ratio of the maximum pixel intensity to the power of the distortion. Like MSE, the pSNR metric is simple to calculate but does not align closely with perceived quality.

The Structural Similarity index metric (SSIM) combines local image structure, luminance, and contrast into a single local quality score. In this metric, structures are patterns of pixel intensities, especially among neighboring pixels, after normalizing for luminance and contrast. Because the human visual system is good at perceiving structure, the SSIM quality metric agrees more closely with the subjective quality score associated with a human perception of quality.

The model designed to assess the quality of videos can be blind/reference-less. For example, a reference-less machine learning model (see FIGS. 9 and 10) can be used. Under such a model, a high-quality file (e.g., a processed file) or a raw file is not used as a reference to compare against a recorded video. The advantage of blind/reference-less models is that they can be applied in situations where a reference is not available. For example, in a surveillance system configured to generate videos, there isn't a ground truth reference for what the recorded video should look like for every possible environment, condition, etc.

Generally, a reference-less model can be pixel-based, parametric- or bitstream-based, or a hybrid of previously mentioned methods. For example, the reference-less model can be an artificial intelligence model or a machine learning model trained on pixels, parameters, or bitstreams from a database of videos. In pixel-based methods, the system uses a decoded representation of the database of videos and analyzes the pixels in the database of videos for video characteristics such as blurriness, data compression, or other distortions. In parametric- or bitstream-based methods, the system analyzes the container format of the transmission and storage of the video data in the database of videos. In this method, the system does not utilize the original or final signal, only the transmission container. In a hybrid model, the system applies both the above-mentioned models.

One reference-less method is a Blind/Reference-less Image Spatial Quality Evaluator (BRISQUE) model. The BRISQUE model can be trained by using a database of security videos with known distortions. The model uses scene statistics to quantify possible losses of quality in the image due to the presence of distortions. The method can be limited to evaluating the quality of images with the same type of distortion. A subjective quality score that accompanies the training image can be applied in order for BRISQUE to be opinion-aware.

Another reference-less method is a Natural Image Quality Evaluator (NIQE) model. The NIQE model can be trained on a database of pristine images. NIQE can measure the quality of images containing arbitrary distortion. NIQE does not use subjective quality scores, so it is opinion-unaware and easier to train. In some cases, the tradeoff is that the NIQE score of an image might not correlate as well as the BRISQUE score with the human perception of quality. In some embodiments, the network-connected surveillance system can use the BRISQUE model, the NIQE model, or a combination of the two models.

By iteratively evaluating the quality of the video recordings, the network-connected surveillance system can apply parameter settings that result in video recordings of higher quality. These parameter settings can then be pushed out to electronic devices as updated. For example, the analytics system can transmit updated parameter(s) to one or more base stations that are responsible for relaying the updated parameter(s) to security cameras as necessary.

These updates could be provided on a more personalized basis. For example, the analytics system can identify those security cameras in similar surveilled environments based on ambient light level, event frequency, the presence of pets and/or children, geographical location, etc. In such embodiments, the analytics system can only transmit updated parameter(s) to those base stations corresponding to security cameras in similar surveilled environments. Such action ensures that security cameras in dissimilar surveilled environments (e.g., brightly lit backyards compared to dimly lit alleys) do not receive the same updated parameter(s).

In some embodiments these parameters are updated on a periodic basis (e.g., daily, weekly, or monthly), while in other embodiments these parameters are updated on an ad hoc basis. For example, these parameters can be updated when receiving a request to do so from an administrator, receiving an indication that the corresponding electronic device has been deployed in a new surveilled environment, etc.

In other embodiments, the analytics system can form profiles for regularly surveilled environments based on ambient light, event frequency, geographic location of the camera, environmental characteristics, etc. Additionally, the analytics system can form a profile based on the Internet Protocol (IP) address of the network or device (i.e., camera (s) or user device(s)) to get the geographical location of a device. The profiles can contain quality metric values, which provide for optimal video data. In such embodiments, the analytics system can transmit the previously optimized parameters to those base stations corresponding to security cameras in regularly surveilled environments. For example, if the analytics system recognizes, by assessing the ambient light, geographic location, etc., that a camera is currently surveilling a previously surveilled living room, the analytics system will update the parameters of the camera to the previously optimized settings for the living room.

In step 510, the second phase of training can employ various methods of training. In one embodiment, the system can use any of the video-quality assessment methods used in initial and pre-launch training steps 505 and 510 and mentioned herein (e.g., BRISQUE, MSE, NIQE, etc.). In another embodiment, the camera system can be deployed to a group of beta testers that mimic the use of future users of the camera system. The beta users can be trained specifically to identify characteristics of recorded video data to determine the image quality recorded by individual security cameras. For example, the group of testers can be a group of one hundred beta testers. The beta testers can deploy the encoder to capture actual video data. The beta testers review the provided videos to determine the performance of the encoders. This review is used as feedback to update the parameters and thresholds of the camera system to improve its performance.

In step 515, post-launch training can use a variety of optimization methods such as feedback from trained users, filtered feedback from large numbers of customers and consumers, image quality evaluation models, or a combination thereof. This can occur after the network-connected surveillance system has been sold and implemented at a customer site.

For example, this step can use natural training. The training addresses problems with the video data that is being generated at a camera. One challenge that the system can encounter is that the generated image is blurry. The blurriness is likely associated with optical sensor performance or with the encoding performed by the encoder. The encoder can determine that some scenes capture a large amount of motion involving many pixels. One scene can have only 10% of pixels that have movement, while another scene can have 80% of pixels that have movement. Scenes with a high percentage of pixels with movement can exhibit more blurriness.

A scene with a lot of motion can require encoding with a large quantity of data. For example, the encoder can use 10 megabits per second to record the large amount of details. Since the large amount of data can exceed the budget of data allowed by the system (e.g., constraints due to memory or bandwidth capacity), the encoder will need to reduce the bit rate for subsequent data in the scene to compensate. However, rapid changes in the bit rate encoding can result in video that is clearly defined for a period and then abruptly becomes blurry. To address this problem, the system can specifically limit the bit rate of video data encoded to under 10 megabits per second. Similarly, the system can limit the rate of change of the bit rate such that the encoded video does not drastically fluctuate in quality.

Encoding parameters can be defined for each individual camera. Additionally, parameters can be defined for different types of scenes. For example, parameters can be defined for day scenes and different parameters can be set for night scenes. In further detail, parameters can be defined for different times of the day to account for changing conditions such as lighting and wind. Some of the parameters associated with the sensor include luminance, color, and contrast. Additionally, a rate control algorithm can be used to moderate the adjustment of bit rates as described above.

The third step can also involve a natural scene statistics (NSS) model. The NSS model assumes that natural images possess certain regular statistical properties. Captured distortions in a recorded video will change the statistical properties of natural images. Therefore, the key idea of NSS-based metrics is to quantify the image quality degradations by measuring the losses of "naturalness." In some embodiments, the features of a recorded video are extracted using the NSS models.

Then, the extracted features are used to train a learning model by mapping the extracted features to subjective scores. Then, the quality of subsequent recorded videos is predicted using the trained model. In some embodiments, evaluation of statistical properties can be executed by using the NIQE and/or BRISQUE models. The models determine that a normal image or an image with desirable qualities has a certain distribution. When an image has a distribution that is significantly different, then the evaluation reveals that the image is not normal or has undesirable qualities. The evaluators require a training period to first establish or assign scores to statistical properties of reference images. Once the training is complete, the evaluator can use the assigned scores to determine the quality of evaluated images.

The statistical data involves processing an image and describing the image in terms of the statistical distribution (properties) of certain characteristics. For example, the statistical distribution can be a distribution representing the luminance, contrast, or blurriness of the pixels in an evaluated image. If the statistical distribution of the blurriness of an image is significantly different from a normal blurriness distribution, this can indicate that the image is excessively blurry.

For example, the evaluator can determine that the video is excessively blurry. This can occur when there is a large amount of motion in the surveilled area. To remedy the blurriness, the system can increase the bit rate. However, memory constraints can require the camera to alternate between a high bit rate and a lower bit rate. This can result in low-quality video for the time period with a lower bit rate.

To address or prevent low-quality images due to drastic changes in the blurriness of recorded videos, the encoder can be adjusted to moderate the rate control such that a video stream is encoded without drastic bit rate changes. The rate control can be moderated by setting parameters such as the maximum bit rate and/or target bit rate. Quantization parameters for the reference frame and delta frame can also be set.

Additionally, the camera can adjust parameters such as the gain. For example, a camera can be positioned in a scene with little light. The camera can initially increase the gain to increase the sensitivity of the sensor to capture the low level of light. However, a high gain produces noise that resembles motion. The resulting high gain image can increase the blurriness due to the perceived motion and require a high bit rate to capture the motion. To address this, the camera can compensate by lowering the gain. Additionally, the camera can also apply a low pass filter to remove the noise using a digital signal processor.

The parameters described above can be determined by the system using cloud-based computing resources. That is, encoded video can be transmitted to the cloud-based computing resource for evaluation and analysis as described above. The evaluation and analysis produces updated parameters for the camera. The parameters are then transmitted from the cloud-based computing resource to the camera system. Specifically, the parameters can be transmitted to each individual camera. In some embodiments, the parameters can be transmitted to base stations associated with the cameras. The base stations can store the parameters and transmit the parameters to the associated cameras when the cameras wake up from sleep mode.

In addition to performing training steps, the network-connected surveillance system can also perform feedback steps. The surveillance system receives user feedback indicating the user's perception of the quality of the video. For example, the user can use an interface to provide a score, narrative, or other indication of the perceived quality of the recorded video. The interface can be accessible via a web browser, mobile application, desktop application, or over-the-top (OTT) application. If an untrained customer reports an issue on a video, the video can be checked manually by technical support and then incorporated as training material. Additionally, the reported issues from untrained customers can also be filtered by software that can look for specific issues.

Figure 6:
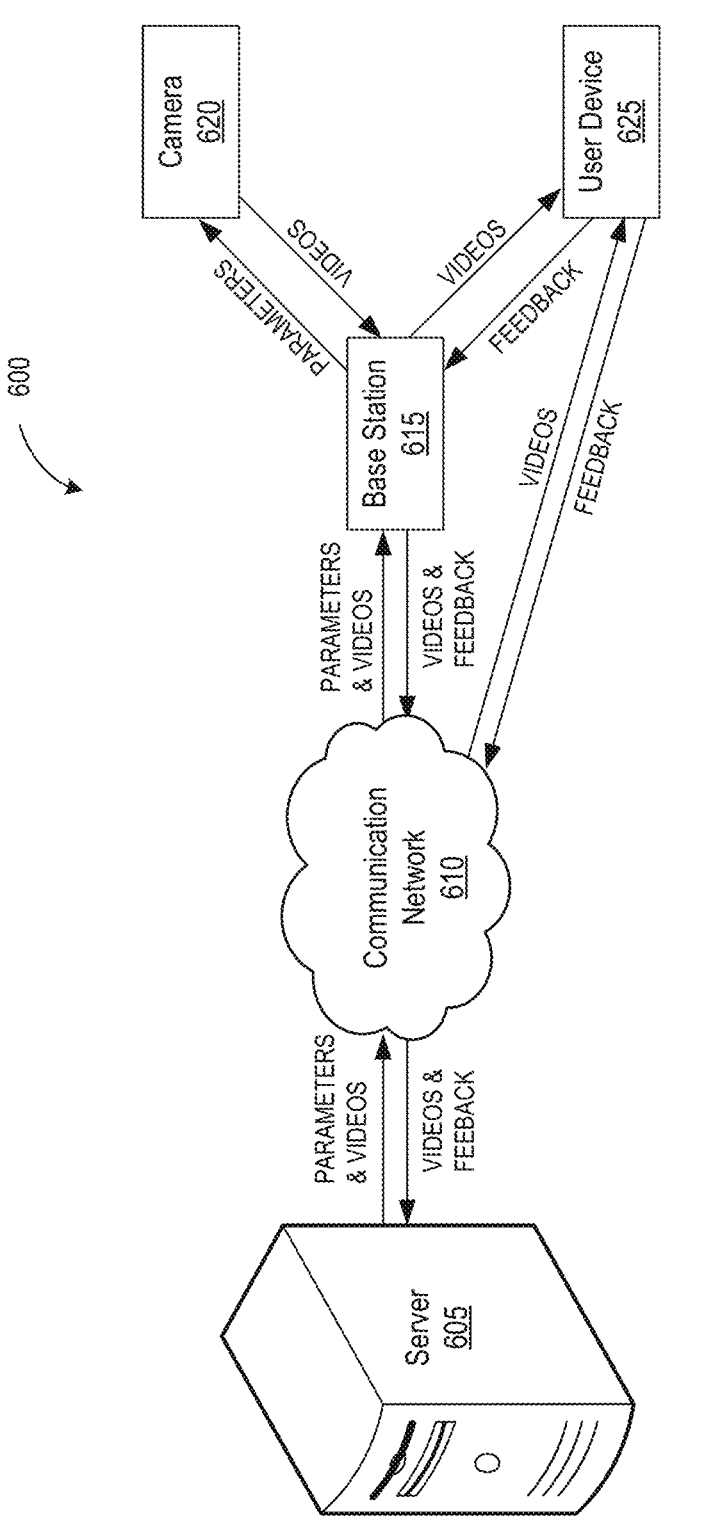
FIG. 6 is a high-level system diagram of a surveillance system that iteratively updates one or more parameters of an electronic device, such as a camera.

FIG. 6 is a high-level system diagram of a surveillance system that iteratively updates one or more parameters of an electronic device, such as a camera. The system diagram depicts possible exchanges of video data, camera parameters, and user feedback between various components of a network-connected surveillance system 600. The network-connected surveillance system 600 includes server 605, communication network 610, base station 615, camera 620, and user device 625. In some embodiments, the network-connected surveillance system 600 can include more than one of each of the components depicted. For example, the network-connected surveillance system 600 can include more than one camera or more than one user device.

Camera 620 provides video data to base station 615. In turn, the base station 615 can transmit at least some of the video data to server 605 via communication network 610. Server 605 can analyze the video data in a manner consistent with the descriptions above and transmit updated parameters to base station 615 and/or camera 620. Additionally or alternatively, base station 615 can analyze the video data in a manner consistent with the descriptions above and transmit updated parameters to camera 620. In some embodiments, the base station 615 can store the parameters for transmission to camera 620 when camera 620 wakes up from a sleep state. Additionally, the video data from camera 620 can be transmitted to user device 625 (e.g., directly or indirectly via base station 615) or to server 605 via communication network 610. A user of user device 625 can view the video data and provide feedback data to base station 615, server 605, or camera 620.

For example, camera 620 can take a video of the environment outside the front door of a residential home. Camera 620 can then transmit the video data to user device 625, from which a user can provide feedback to server 605 via communication network 610. The feedback, for example, can be that the video is blurry. Based on the user feedback, the server 605 can optimize parameters, such as resolution, of camera 620 using the methods described herein. The optimized parameters are sent to camera 620 via the communication network 610 and base station 615. Upon receipt, the camera 620 can take higher-resolution videos. This process can iterate until optimal videos are captured by camera 620. Additionally, the various components of the system can communicate with each other via separate networks that are not shown here. For example, the camera 620 and user device 625 can communicate with base station 615 via separate Bluetooth communication channels or Wi-Fi communication channels, while base station 615 can communicate with server 605 via the Internet.

In another embodiment, camera 620 and base station 615 can be incorporated within the same device. Multiple devices can be used in this manner, such as a personal computer, tablet computer, personal digital assistant (PDA), mobile phone, game console, music player, wearable electronic device (e.g., a watch or fitness accessory), network-connected ("smart") electronic device (e.g., a television or home assistant device), virtual/augmented reality system (e.g., a head-mounted display), or some other electronic device. For example, an individual can use an iPhone to take a video. The iPhone can function as base station 615 to transmit and receive the video and parameters from the server and user device.

Figure 7:
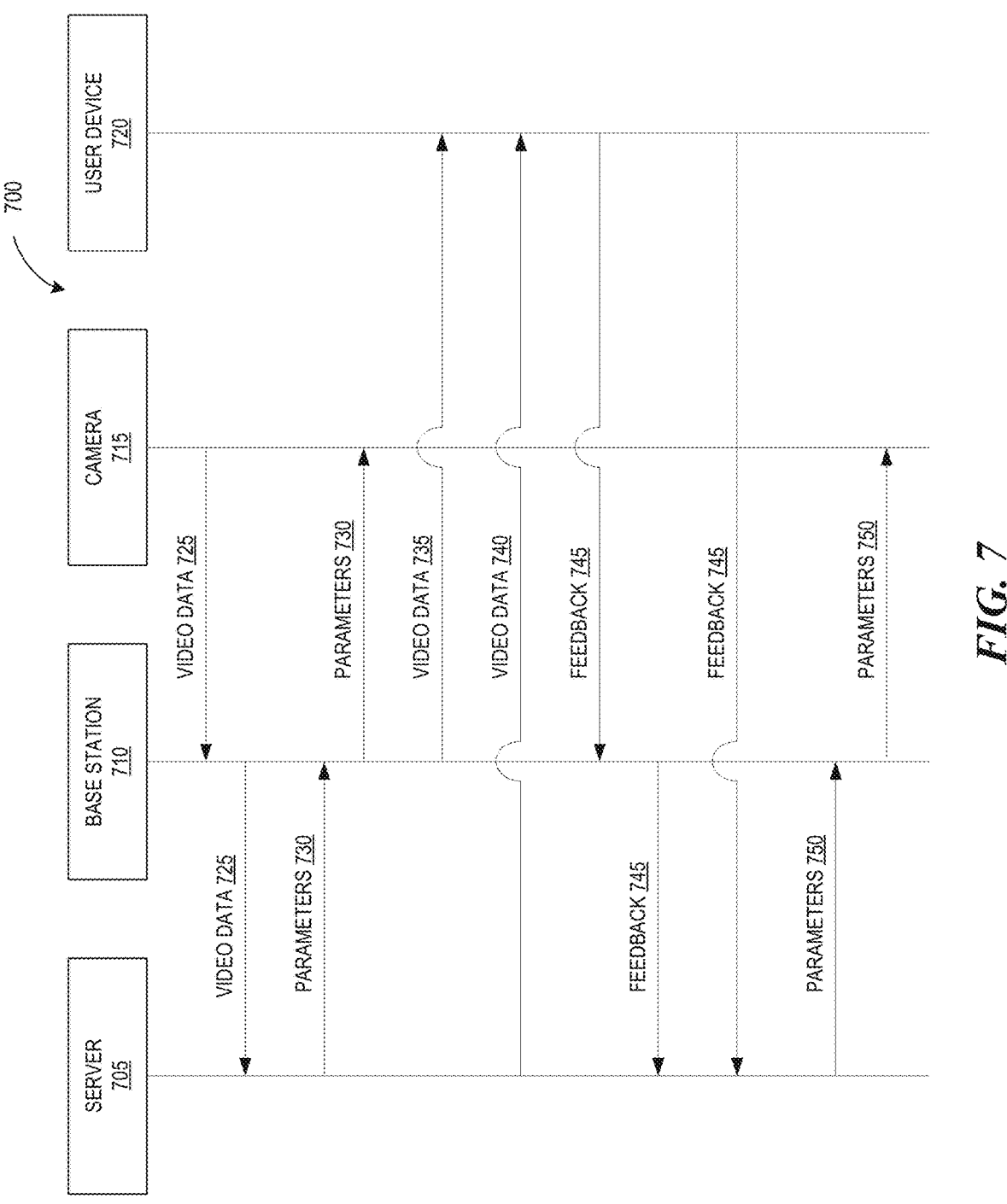
FIG. 7 is a sequence diagram of a technique for updating one or more parameters of an electronic device.

FIG. 7 is a sequence diagram of a technique 700 for updating one or more parameters of an electronic device. The sequence diagram depicts the communication between server 705, base station 710, camera 715, and user device 720. In some embodiments, the communication between server 705, base station 710, camera 715, and user device 720 can be implemented as a network-connected surveillance system. In some embodiments, the network-connected surveillance system can include more than one of each of the components depicted. For example, the network-connected surveillance system can include more than one camera or more than one user device. In some embodiments, the technique 700 can be performed by the network-connected surveillance system 600 of FIG. 6.

First, camera 715 can provide video data 725 to base station 710. In turn, base station 710 can relay the video data 725 to server 705. Server 705 can analyze the video data 725 and produce parameters 730 that affect the operation of camera 715. Parameters 730 are then transmitted to base station 710. In some embodiments, base station 710 immediately transmits the received parameters 730 to camera 715. In other embodiments, base station 710 stores the received parameters 730. When base station 710 determines that camera 715 has awoken from a sleep mode, it will transmit the parameters 730 to camera 715.

Additionally, video data 735 and 740 originating from camera 715 can be stored at base station 710 and server 705, respectively. Video data 735 and/or 740 can be transmitted from base station 710 and server 705, respectively, to user device 720. The user device 720 can be any device capable of displaying video to be viewed by a user. In some embodiments, the user device 720 is a mobile device capable of viewing video data. Once user device 720 receives video data 735 and/or 740, the user device 720 can view the video stream and provide feedback assessing the quality of the video data. User device 720 transmits feedback 745 to base station 710. The base station 710 can in turn transmit feedback 745 to server 705. Alternatively or additionally, user device 720 can transmit feedback 745 directly to server 705 without using base station 710.

Server 705 can analyze feedback 745 and produce parameters 750 that affect the operation of camera 715. Parameters 750 are then transmitted to base station 710. Similar to parameters 730 described above, base station 710 can immediately transmit the received parameters 750 to camera 715. In other embodiments, base station 710 stores the received parameters 750. When base station 710 determines that camera 715 has awoken from a sleep mode, it will transmit the parameters 750 to camera 715. In some embodiments, the image quality evaluation models discuss herein can be used.

FIG. 8 depicts a flow diagram of a process that can be performed by a surveillance system. In step 805, a camera system surveils an environment for a predetermined time period. In step 810, the batch of videos collected for that time period is sent to the server. The camera system can transmit the video data to the server via the base station and communication network. As mentioned above, the base station and camera can be two separate devices or incorporated within the same device, such as a personal computer, tablet computer, personal digital assistant (PDA), mobile phone, game console, music player, wearable electronic device (e.g., a watch or fitness accessory), network-connected ("smart") electronic device (e.g., a television or home assistant device), virtual/augmented reality system (e.g., a head-mounted display), or some other electronic device.

In step 815, the analytics system determines the quality metric of each video in the batch of videos. The analytics system can be a part of the server. As mentioned above with regard to the base station, the server can also be a separate device or be a part of a larger system. For example, a smartphone can be used as the surveillance mechanism, the base station, and the analytics system.

The quality metric can be a numeric representation of the user's perceived quality. For example, the quality metric can be a summation of or based on several quality factors such as blurriness, hue, contrast, pixel distortion, data compression, brightness, etc. In another example, the quality metric can be based on subjective quality tests such as single or multiple stimulus procedures. These procedures are, preferably, done during the pre-launch training phase. However, they can be performed at a later stage as the system iteratively assesses the quality of the videos.

In step 820, the system determines whether the quality metric of each video is above a first threshold. As discussed herein, the first threshold can be, for example, the result of pre-launch training, profiles, or based on user feedback. If the quality metric is not above a first threshold, the system proceeds to step 825. In step 825, the system determines which camera parameter(s) to alter to improve the quality metric of future videos. After the determination is made, the process jumps to step 845, where the parameter change instruction is sent to the camera. Conversely, if the quality metric is above the first threshold, the system proceeds to step 830 and determines whether the quality metric is below a second threshold. If the quality metric is not below the second threshold, in step 835, the system determines that the video has been optimized and can make a profile. A profile, as described herein, can contain environmental characteristics, the optimized parameters, etc. Thus, in the future, if the system determines that a camera is surveilling an environment that is similar to a previously surveilled environment and for which the system was optimized, the system can use similar parameters for the current environment. Conversely, if the quality metric is below the second threshold, in step 840, the system determines which camera parameter(s) to alter to improve the quality metric of future videos. After the determination is made, the parameter change instruction is sent to the camera in step 845. In step 850, the camera operates under the newly received parameter(s) and collects a second batch of videos. The process then repeats with step 820.

FIG. 9 is a flowchart of a process for updating the parameters of a camera. In some implementations, the process is performed by electronic device 200 illustrated and described in more detail with reference to FIG. 2A. In some implementations, the process is performed by a computer system, e.g., example computer system 1100 illustrated and described in more detail with reference to FIG. 11. Particular entities, for example, the base station 250 (as shown by FIG. 2B) or the network-accessible server system 406 illustrated and described in more detail with reference to FIGS. 4A-B perform some or all of the steps of the process in other implementations. Likewise, implementations can include different and/or additional steps or can perform the steps in different orders.

At 904, a computer system receives a first video captured by a camera. The first video is captured when the camera has a parameter set to a first value. For example, the parameter is an aperture size. The first value represents a smaller aperture size used to film daytime scenes. The first value can be a percentage, an integer, a floating point value, a hexadecimal value, a number between 0 and 1.00, or a binary value, and can be expressed in different types of units. The camera has the parameter set to the first value based on pre-launch training of a reference-less machine learning model. For example, the reference-less machine learning model can be the same as or similar to the AI model 1030 or the machine learning (ML) framework 1014 illustrated and described in more detail with reference to FIG. 10. Reference-less models are described in more detail with reference to FIG. 5. The reference-less machine learning model is trained using a database of videos having known distortions as explained in more detail with reference to FIG. 5. The distortions measured can be blurriness, data compression artifacts, inadequate lighting in night scenes, and/or lack of contrast.

At 908, the computer system extracts a feature vector from the first video. Explicit and implicit feature extraction are described in more detail with reference to FIG. 10. The feature vector can describe distortions present in the first video, e.g., using binary values, graphical descriptions, colors, etc.

At 912, the computer system determines, using the reference-less machine learning model, a quality metric of the first video based on the feature vector. AI and machine learning determination of output quantities from a set of features is described in more detail with reference to FIG. 10. The quality metric can be the Mean-Squared Error (MSE) metric, the peak Signal-to-Noise Ratio (pSNR), or the Structural Similarity index metric (SSIM) as described in more detail with reference to FIG. 5. The quality metric can indicate statistical properties of the first video corresponding to the distortions in the first video. The quality metric can be expressed as a percentage, an integer, a floating point value, a hexadecimal value, a number between 0 and 1.00, or a binary value.

At 916, the computer system determines a second value for the parameter of the camera based on the quality metric of the first video. For example, if the parameter is an aperture size, the second value can represent a larger aperture size than the first value. The larger aperture size can be used to film nighttime scenes. The second value can be determined using a deterministic algorithm, a heuristic algorithm, and/or the reference-less machine learning model.

At 920, the computer system causes the camera to set the parameter to the second value. For example, if the computer system is implemented on base station 250 (as shown by FIG. 2B), the computer system can transmit an instruction to the camera to cause the parameter to be set to the second value. If the computer system is implemented on network-accessible server system 406, the computer system can transmit an instruction to a base station or the camera to cause the parameter to be set to the second value. If the computer system is implemented on electronic device 200 (as shown by FIG. 2A), the processor(s) can transmit an instruction to the optical sensor 206 or the motion sensing module 208 to cause the parameter to be set to the second value. The quality metric of a second video captured by the camera is greater than the quality metric of the first video when the parameter is set to the second value. For example, the second video is less blurry, sharper, or has better contrast.

FIG. 10 is a block diagram illustrating an example artificial intelligence (AI) system, in accordance with one or more embodiments of this disclosure. The AI system 1000 is implemented using components of the example computer system 1100 illustrated and described in more detail with reference to FIG. 11. For example, the AI system 1000 can be implemented using the processor 1102 and instructions 1108 programmed in the main memory 1106 illustrated and described in more detail with reference to FIG. 11. Likewise, implementations of the AI system 1000 can include different and/or additional components or be connected in different ways.

As shown, the AI system 1000 can include a set of layers, which conceptually organize elements within an example network topology for the AI system's architecture to implement a particular AI model 1030. Generally, an AI model 1030 is a computer-executable program implemented by the AI system 1000 that analyzes data to make predictions. Information can pass through each layer of the AI system 1000 to generate outputs for the AI model 1030. The layers can include a data layer 1002, a structure layer 1004, a model layer 1006, and an application layer 1008. The algorithm 1016 of the structure layer 1004 and the model structure 1020 and model parameters 1022 of the model layer 1006 together form the example AI model 1030. The optimizer 1026, loss function engine 1024, and regularization engine 1028 work to refine and optimize the AI model 1030, and the data layer 1002 provides resources and support for application of the AI model 1030 by the application layer 1008.

The data layer 1002 acts as the foundation of the AI system 1000 by preparing data for the AI model 1030. As shown, the data layer 1002 can include two sub-layers: a hardware platform 1010 and one or more software libraries 1012. The hardware platform 1010 can be designed to perform operations for the AI model 1030 and include computing resources for storage, memory, logic, and networking, such as the resources described in relation to FIG.

11. The hardware platform 1010 can process amounts of data using one or more servers. The servers can perform backend operations such as matrix calculations, parallel calculations, machine learning training, and the like. Examples of servers used by the hardware platform 1010 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 1010 can include Infrastructure as a Service (IaaS) resources, which are computing resources (e.g., servers, memory, etc.) offered by a cloud services provider. The hardware platform 1010 can also include computer memory for storing data about the AI model 1030, application of the AI model 1030, and training data for the AI model 1030. The computer memory can be a form of random-access memory (RAM), such as dynamic RAM, static RAM, and non-volatile RAM. Training a network-connected surveillance system is described in more detail with reference to FIG. 5.

The software libraries 1012 can be thought of as suites of data and programming code, including executables, used to control the computing resources of the hardware platform 1010. The programming code can include low-level primitives (e.g., fundamental language elements) that form the foundation of one or more low-level programming languages, such that servers of the hardware platform 1010 can use the low-level primitives to carry out specific operations. The low-level programming languages do not require much, if any, abstraction from a computing resource's instruction set architecture, allowing them to run quickly with a small memory footprint. Examples of software libraries 1012 that can be included in the AI system 1000 include the Intel® Math Kernel Library, Nvidia cuDNN, Eigen, and Open-BLAS.

The structure layer 1004 can include a machine learning (ML) framework 1014 and an algorithm 1016. The ML framework 1014 can be thought of as an interface, library, or tool that allows users to build and deploy the AI model 1030. The ML framework 1014 can include an open-source library, an application programming interface (API), a gradient-boosting library, an ensemble method, and/or a deep learning toolkit that work with the layers of the AI system to facilitate development of the AI model 1030. For example, the ML framework 1014 can distribute processes for application or training of the AI model 1030 across multiple resources in the hardware platform 1010. The ML framework 1014 can also include a set of pre-built components that have the functionality to implement and train the AI model 1030 and allow users to use pre-built functions and classes to construct and train the AI model 1030. Thus, the ML framework 1014 can be used to facilitate data engineering, development, hyperparameter tuning, testing, and training for the AI model 1030. For example, a reference-less machine learning model (e.g., AI model 1030) can be trained on distortions in videos, such as blurriness, data compression artifacts, inadequate lighting in night scenes, and/or lack of contrast.

Examples of ML frameworks 1014 or libraries that can be used in the AI system 1000 include TensorFlow, PyTorch, Scikit-Learn, Keras, and Caffe. Random Forest is a machine learning algorithm that can be used within the ML frameworks 1014. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., SageMaker) that can be used for platform building, training, and deploying ML models.

In some embodiments, the ML framework 1014 performs deep learning (also known as deep structured learning or hierarchical learning) directly on the input data to learn data representations, as opposed to using task-specific algorithms. In deep learning, no explicit feature extraction is performed; the features of the feature vector are implicitly extracted by the AI system 1000. For example, the ML framework 1014 can use a cascade of multiple layers of nonlinear processing units for implicit feature extraction and transformation. Each successive layer uses the output from the previous layer as input. The AI model 1030 can thus learn in supervised (e.g., classification) and/or unsupervised (e.g., pattern analysis) modes. The AI model 1030 can learn multiple levels of representations that correspond to different levels of abstraction, wherein the different levels form a hierarchy of concepts. In this manner, the AI model 1030 can be configured to differentiate features of interest from background features.

The algorithm 1016 can be an organized set of computer-executable operations used to generate output data from a set of input data and can be described using pseudocode. The algorithm 1016 can include complex code that allows the computing resources to learn from new input data and create new/modified outputs based on what was learned. In some implementations, the algorithm 1016 can build the AI model 1030 through being trained while running computing resources of the hardware platform 1010. This training allows the algorithm 1016 to make predictions or decisions without being explicitly programmed to do so. Once trained, the algorithm 1016 can run the computing resources as part of the AI model 1030 to make predictions or decisions, improve computing resource performance, or perform tasks. The algorithm 1016 can be trained using supervised learning, unsupervised learning, semi-supervised learning, and/or reinforcement learning.

Using supervised learning, the algorithm 1016 can be trained to learn patterns (e.g., lighting of scenes captured on video) based on labeled training data. The training data can be a database of video having known distortions. The training data can be labeled by an external user or operator. For instance, a user can collect a set of training data, such as by capturing data from sensors, videos from a camera, outputs from a model, and the like. In an example implementation, training data can include data received from multiple cameras. The user can label the training data based on one or more classes and train the AI model 1030 by inputting the training data into the algorithm 1016. The algorithm determines how to label the new data based on the labeled training data. The user can facilitate collection, labeling, and/or input via the ML framework 1014. In some instances, the user can convert the training data to a set of feature vectors for input into the algorithm 1016. Once the algorithm 1016 is trained, the user can test the algorithm 1016 on new data to determine whether the algorithm 1016 is predicting accurate labels for the new data. For example, the user can use cross-validation methods to test the accuracy of the algorithm 1016 and retrain the algorithm 1016 on new training data if the results of the cross-validation are below an accuracy threshold.

Supervised learning can involve classification and/or regression. Classification techniques involve teaching the algorithm 1016 to identify a category of new observations based on training data and are used when input data for the algorithm 1016 is discrete. Said differently, when learning through classification techniques, the algorithm 1016 receives training data labeled with categories (e.g., classes) and determines how features observed in the training data (e.g., distortion in videos) relate to the categories (e.g., twilight scenes). Once trained, the algorithm 1016 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1016 is continuous. Regression techniques can be used to train the algorithm 1016 to predict or forecast relationships between variables. To train the algorithm 1016 using regression techniques, a user can select a regression method for estimating the parameters of the model. The user collects and labels training data that is input to the algorithm 1016 such that the algorithm 1016 is trained to understand the relationship between data features and the dependent variable(s). Once trained, the algorithm 1016 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 1016 learns patterns from unlabeled training data. In particular, the algorithm 1016 is trained to learn hidden patterns and insights relating to input data, which can be used for data exploration or for generating new data. Here, the algorithm 1016 does not have a predefined output, unlike the labels output when the algorithm 1016 is trained using supervised learning. Another way unsupervised learning is used to train the algorithm 1016 to find an underlying structure of a set of data is by grouping the data according to similarities and representing that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has fewer or no similarities to another group. Examples of clustering techniques include density-based methods, hierarchical-based methods, partitioning methods, and grid-based methods. In one example, the algorithm 1016 can be trained to be a K-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1016 can be trained to be an Isolation Forest, local outlier factor (LOF) algorithm, or k-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 1016 include factor analysis, item response theory, latent profile analysis, and latent class analysis.

In some embodiments, the AI system 1000 trains the algorithm 1016 of the AI model 1030, based on the training data, to correlate the feature vector to expected outputs in the training data. As part of the training of the AI model 1030, the AI system 1000 forms a training set of features and training labels by identifying a positive training set of features that have been determined to have a desired property in question, and, in some embodiments, forms a negative training set of features that lack the property in question. The AI system 1000 applies the ML framework 1014 to train the AI model 1030, such that, when applied to the feature vector, it outputs indications of whether the feature vector has an associated desired property or properties, such as a probability that the feature vector has a particular Boolean property, or an estimated value of a scalar property. The AI system 1000 can further apply dimensionality reduction (e.g., via linear discriminant analysis (LDA), principal component analysis (PCA), or the like) to reduce the amount of data in the feature vector to a smaller, more representative set of data.

The model layer 1006 implements the AI model 1030 using data from the data layer 1002 and the algorithm 1016 and ML framework 1014 from the structure layer 1004, thus enabling decision-making capabilities of the AI system 1000. The model layer 1006 includes a model structure 1020, model parameters 1022, a loss function engine 1024, an optimizer 1026, and a regularization engine 1028.

The model structure 1020 describes the architecture of the AI model 1030 of the AI system 1000. The model structure 1020 defines the complexity of the pattern/relationship that the AI model 1030 expresses. Examples of structures that can be used as the model structure 1020 include decision trees, support vector machines, regression analyses, Bayesian networks, Gaussian processes, genetic algorithms, and artificial neural networks (or, simply, neural networks). The model structure 1020 can include a number of structure layers, a number of nodes (or neurons) at each structure layer, and activation functions of each node. Each node's activation function defines how the node converts data received to data output. The structure layers can include an input layer of nodes that receive input data and an output layer of nodes that produce output data. The model structure 1020 can include one or more hidden layers of nodes between the input and output layers. The model structure 1020 can be an artificial neural network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1022 represent the relationships learned during training and can be used to make predictions and decisions based on input data. The model parameters 1022 can weight and bias the nodes and connections of the model structure 1020. For instance, when the model structure 1020 is a neural network, the model parameters 1022 can weight and bias the nodes in each layer of the neural network, such that the weights determine the strength of the nodes and the biases determine the thresholds for the activation functions of each node. The model parameters 1022, in conjunction with the activation functions of the nodes, determine how input data is transformed into desired outputs. The model parameters 1022 can be determined and/or altered during training of the algorithm 1016.

The loss function engine 1024 can determine a loss function, which is a metric used to evaluate the performance of the AI model 1030 during training. For instance, the loss function engine 1024 can measure the difference between a predicted output of the AI model 1030 and the actual output of the AI model 1030 and is used to guide optimization of the AI model 1030 during training to minimize the loss function. The loss function can be presented via the ML framework 1014, such that a user can determine whether to retrain or otherwise alter the algorithm 1016 if the loss function is over a threshold. In some instances, the algorithm 1016 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1026 adjusts the model parameters 1022 to minimize the loss function during training of the algorithm 1016. In other words, the optimizer 1026 uses the loss function generated by the loss function engine 1024 as a guide to determine what model parameters lead to the most accurate AI model 1030. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 1026 used can be determined based on the type of model structure 1020 and the size of data and the computing resources available in the data layer 1002.

The regularization engine 1028 executes regularization operations. Regularization is a technique that prevents over- and underfitting of the AI model 1030. Overfitting occurs when the algorithm 1016 is overly complex and too adapted to the training data, which can result in poor performance of the AI model 1030. Underfitting occurs when the algorithm 1016 is unable to recognize even basic patterns from the training data such that it cannot perform well on training data or on validation data. The regularization engine 1028 can apply one or more regularization techniques to fit the algorithm 1016 to the training data properly, which helps constrain the resulting AI model 1030 and improves its ability for generalized application. Examples of regularization techniques include lasso (L1) regularization, ridge (L2) regularization, and elastic (L1 and L2) regularization.

In some embodiments, the AI system 1000 can include a feature extraction module implemented using components of the example computer system 1100 illustrated and described in more detail with reference to FIG. 11. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as the feature vector. The feature vector contains the relevant information from the input data, such that events or data value thresholds of interest can be identified by the AI model 1030 by using this reduced representation. In some example embodiments, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

The application layer 1008 describes how the AI system 1000 is used to solve problems or perform tasks. In an example implementation, the application layer 1008 can be implemented on the electronic device 200 (as shown by FIG. 2A), the base station 250 (as shown by FIG. 2B), or the network-accessible server system 406 illustrated and described in more detail with reference to FIG. 4A. For example, the AI system 1000 uses a reference-less machine learning model to determine a quality metric of a video based on an extracted feature vector. The quality metric can be the Mean-Squared Error (MSE) metric, the peak Signal-to-Noise Ratio (pSNR), or the Structural Similarity index metric (SSIM) as described in more detail with reference to FIG. 5.

Figure 11:
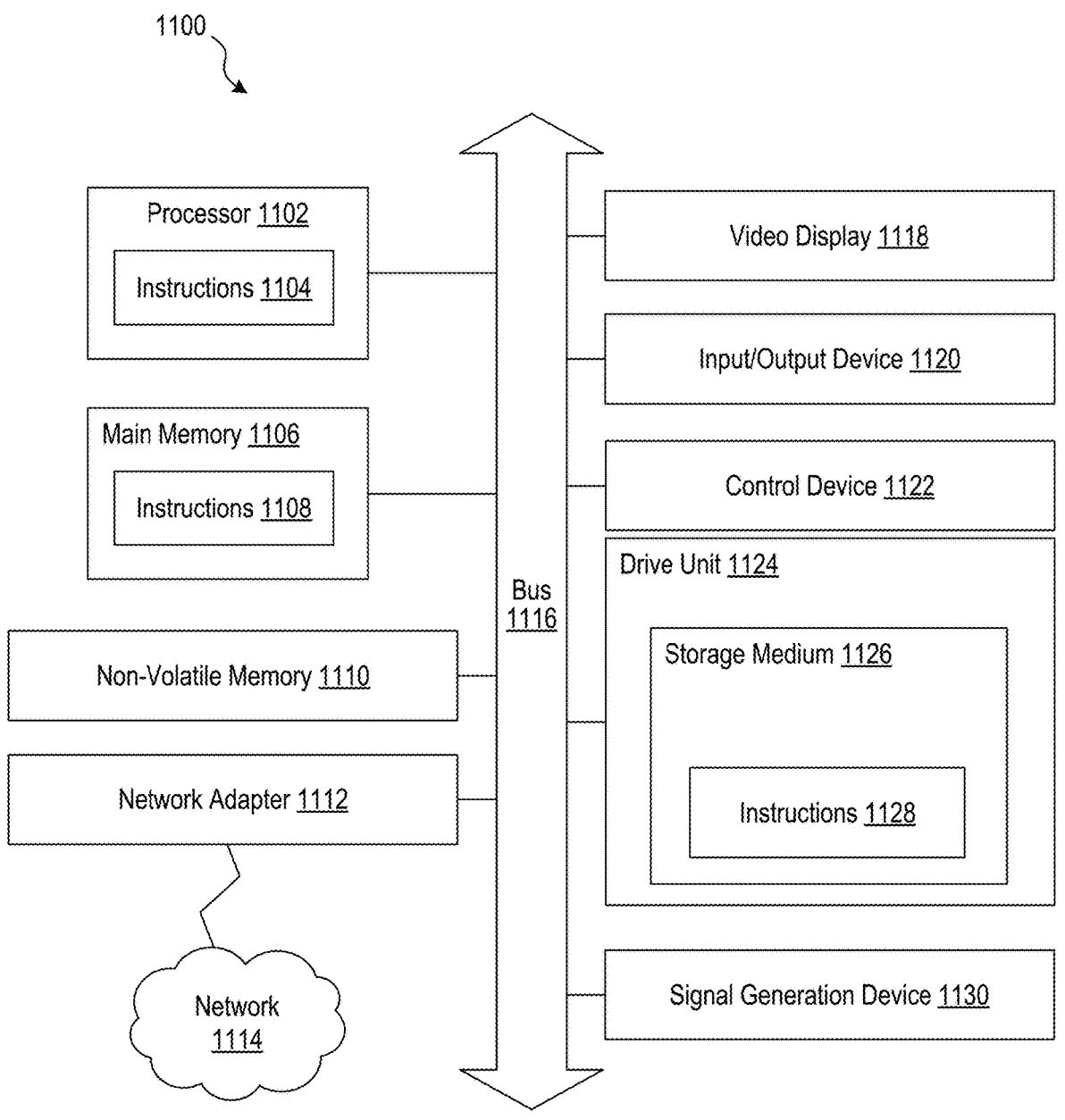
FIG. 11 is a block diagram illustrating an example of a computer system in which at least some operations described herein can be implemented.

FIG. 11 is a block diagram illustrating an example of a computer system 1100 in which at least some operations described herein can be implemented. For example, some components of the computer system 1100 can be hosted on an electronic device (e.g., electronic device 200 of FIG. 2A), a base station (e.g., base station 250 of FIG. 2B), or a network-accessible server system (e.g., network-accessible server system 406 of FIGS. 4A-B).

The computer system 1100 can include one or more central processing units ("processors") 1102, main memory 1106, non-volatile memory 1110, network adapter 1112 (e.g., network interface), video display 1118, input/output devices 1120, control device 1122 (e.g., keyboard and pointing devices), drive unit 1124 including a storage medium 1126, and signal generation device 1130 that are communicatively connected to a bus 1116. The bus 1116 is illustrated as an abstraction that represents one or more physical buses and/or point-to-point connections that are connected by appropriate bridges, adapters, or controllers. The bus 1116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

The computer system 1100 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1100.

While the main memory 1106, non-volatile memory 1110, and storage medium 1126 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 1128. The terms "machine-readable medium" and "storage medium" shall also be taken to include any medium that is capable of storing, encoding, or carrying a set of instructions for execution by the computer system 1100.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in a computing device. When read and executed by the one or more processors 1102, the instruction(s) cause the computer system 1100 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1110, floppy and other removable disks, hard disk drives, optical disks (e.g., Compact Disk Read-Only Memory (CD-ROMs), Digital Versatile Disks (DVDs)), and transmission-type media such as digital and analog communication links.

The network adapter 1112 enables the computer system 1100 to mediate data in a network 1114 with an entity that is external to the computer system 1100 through any communication protocol supported by the computer system 1100 and the external entity. The network adapter 1112 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1112 can include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments can vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:

receiving, by a computer system, a first video captured by a camera having a parameter set to a first value based on pre-launch training of a reference-less machine learning model using a database of videos having known distortions;

extracting a feature vector from the first video, wherein the feature vector describes distortions present in the first video;

determining, using the reference-less machine learning model, a quality metric of the first video based on the feature vector, wherein the quality metric indicates statistical properties of the first video corresponding to the distortions;

determining a second value for the parameter of the camera based on the quality metric of the first video; and causing the camera to set the parameter to the second value, wherein the quality metric of a second video captured by the camera is greater than the quality metric of the first video when the parameter is set to the second value.

2. The method of claim 1, wherein the first and second values are based on a data storage constraint of the computer system.

3. The method of claim 1, wherein the first and second values are based on a memory constraint of the computer system.

4. The method of claim 1, wherein the first and second values are based on a bandwidth constraint of the computer system.

5. The method of claim 1, wherein the first and second values are based on an image quality assessment operation.

6. The method of claim 1, wherein the pre-launch training uses pixel data or parametric data in the database of videos.

7. The method of claim 1, wherein the quality metric represents a hue, a blurriness, a contrast, a saturation, and/or a brightness.

8. An electronic device comprising:

a network interface for communicating with a camera over a wireless communication channel;

a processor; and a memory having instructions stored thereon that, when executed by the processor, cause the electronic device to:

receive a first video captured by the camera when the camera has a parameter set to a first value based on pre-launch training of a reference-less machine learning model using pixel data or parametric data in a database of videos;

extract a feature vector from the first video;

determine, using the reference-less machine learning model, a quality metric of the first video based on the feature vector, wherein the quality metric indicates statistical properties of the first video;

determine a second value for the parameter of the camera based on the quality metric of the first video; and cause the camera to set the parameter to the second value, wherein the quality metric of a second video captured by the camera increases when the parameter is set to the second value.

9. The electronic device of claim 8, wherein the first and second values are based on a data storage constraint of the electronic device.

10. The electronic device of claim 8, wherein the first and second values are based on a memory constraint of the electronic device.

11. The electronic device of claim 8, wherein the first and second values are based on a bandwidth constraint of the wireless communication channel.

12. The electronic device of claim 8, wherein the first and second values are based on an image quality assessment operation.

13. The electronic device of claim 8, wherein the videos in the database have known distortions.

14. The electronic device of claim 8, wherein the feature vector describes distortions present in the first video.

15. A computer system comprising:

a processor; and a memory having instructions stored thereon that, when executed by the processor, cause the computer system to:

receive video captured by a camera when the camera has a parameter set to a first value based on pre-launch training of a reference-less machine learning model using pixel data or parametric data in a database of videos;

determine, using the reference-less machine learning model, a quality metric of the video;

cause the camera to set the parameter to a second value determined based on the quality metric of the video;

detect motion in the video; and in response to detecting motion in the video, cause a security light communicably coupled to the computer system to:

illuminate an environment depicted by the video.

16. The computer system of claim 15, wherein the quality metric represents a hue, a blurriness, a contrast, a saturation, and/or a brightness of the video.

17. The computer system of claim 15, wherein the videos in the database have known distortions.

18. The computer system of claim 15, wherein the first and second values are based on a data storage constraint of the camera.

19. The computer system of claim 15, wherein the first and second values are based on a memory constraint of the camera.

20. The computer system of claim 15, wherein the first and second values are based on a bandwidth constraint of the camera.

\* \* \* \* \*